United States Patent
Ferdinand et al.

(10) Patent No.: US 12,476,858 B2
(45) Date of Patent: Nov. 18, 2025

(54) METHODS AND APPARATUS FOR USING A PHASE TRACKING REFERENCE SIGNAL WITH A SINGLE CARRIER WAVEFORM

(71) Applicant: HUAWEI TECHNOLOGIES CO., LTD., Guangdong (CN)

(72) Inventors: Nuwan Suresh Ferdinand, Kanata (CA); Huang Huang, Guangdong (CN); Qianli Ma, Guangdong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 18/496,825

(22) Filed: Oct. 27, 2023

(65) Prior Publication Data

US 2024/0073079 A1   Feb. 29, 2024

Related U.S. Application Data

(63) Continuation of application No. PCT/CN2021/094836, filed on May 20, 2021.

(51) Int. Cl.
H04L 27/26    (2006.01)

(52) U.S. Cl.
CPC ...... H04L 27/2698 (2013.01); H04L 27/2636 (2013.01)

(58) Field of Classification Search
CPC ............. H04L 27/2698; H04L 27/2636; H04L 5/0048; H04L 27/34
See application file for complete search history.

(56) References Cited

U.S. PATENT DOCUMENTS

2017/0064700 A1* 3/2017 Cao ..................... H04W 72/121
2020/0076647 A1* 3/2020 Zhang .................. H04L 1/0003

FOREIGN PATENT DOCUMENTS

| CN | 109391448 A | 2/2019 |
| EP | 3697142 A1 | 8/2020 |
| WO | 2018202128 A1 | 11/2018 |

OTHER PUBLICATIONS

Nokia et al. "Discussion on PT-RS design for CP-OFDM". 3GPP TSG RAN WG1 NR Ad-Hoc#2. R1-1711308. Qingdao, China, Jun. 27-30, 2017. 10 pages.
Ericsson. "Remaining details on PTRS design". 3GPP TSG RAN WG1 Meeting 91. R1-1720741. Reno, USA, Nov. 27-Dec. 1, 2017. 15 pages.

* cited by examiner

*Primary Examiner* — David S Huang
(74) *Attorney, Agent, or Firm* — Slater Matsil, LLP

(57) ABSTRACT

Aspects of the present application provide methods and devices for a phase tracking reference (PT-RS) scheme for use by a single carrier Offset QAM (SC-OQAM) transmitter and receiver to estimate, and correct, phase errors that occur over the communication link between the SC-OQAM transmitter and receiver. A transmitter may set the sign (positive or negative) of PT-RS symbols dynamically allowing the transmitter to better utilize IQ interference caused by data symbols and other PT-RS symbols. Another aspect of the present disclosure provides a receiver that can estimate phase error due to phase noise without knowing the sign of PT-RS symbol or the sign of IQ interference. This type of phase error estimation improves the phase noise estimation performance, and thus may improve the overall block error rate (BLER) performance at the receiver.

18 Claims, 17 Drawing Sheets

METHODS AND APPARATUS FOR USING A PHASE TRACKING REFERENCE SIGNAL WITH A SINGLE CARRIER WAVEFORM

CROSS-REFERENCE TO RELATED APPLICATION

This application is a continuation of International Patent Application No. PCT/CN2021/094836, filed May 20, 2021, entitled "METHODS AND APPARATUS FOR USING A PHASE TRACKING REFERENCE SIGNAL WITH A SINGLE CARRIER WAVEFORM", the contents of which are incorporated by reference herein its entirety.

TECHNICAL FIELD

The present disclosure relates generally to wireless communications, and in particular embodiments, to using a phase tracking reference signal with a single carrier waveform.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

A single carrier transmission involves a single radio frequency carrier being used to carry information. Therefore, for a signal including multiple symbols, all of the symbols are transmitted in the single carrier frequency. Orthogonal Frequency Divisional Multiplexing (OFDM), on the other hand, uses multiple carrier signals at different radio frequencies. Therefore, for a signal including multiple symbols, some of the symbols are sent on each carrier frequency. Each transmission type has particular benefits, for example single carrier transmission has lower peak to average power ratio (PAPR) properties.

There are several types of single carrier waveforms. One type is known as Discrete Fourier Transform spread OFDM (DFT-s-OFDM), which is standardized in 3GPP. Another type is the more recently proposed single carrier Offset Quadrature Amplitude Modulation (SC-OQAM).

As future wireless communication standards are exploring the usage of higher frequencies to expand bandwidth to increase the capacity, one of the drawbacks in these higher frequencies is phase noise. Phase noise has been found to increases with the higher carrier frequencies. If untreated, the phase noise can result in high error rate causing poor spectral efficiency despite the use of larger bandwidths.

Therefore, mechanisms for implementing phase error estimation and phase error correction for single carrier transmission would be beneficial for communication systems.

SUMMARY

Aspects of the disclosure enable a transmitter to dynamically choose a positive or negative sign for input phase tracking reference signal (PT-RS) symbols so as to achieve an objective such as maximizing IQ interference, fixing IQ interference, or canceling IQ interference effectively. The receiver does not need to know how the transmitter sets the sign or a pattern of signs for a set of PT-RS, but can take advantage of the resulting effect on the signal to determine, for example phase noise error in a receiver signal.

According to some aspects of the disclosure, there is provided a method involving: receiving configuration information including one or more indication to modify one or more phase tracking reference signal (PT-RS) symbols of a PT-RS multiplexing the PT-RS with the data signal to generate a single carrier offset quadrature amplitude modulation (SC-OQAM) signal; and transmitting the SC-OQAM signal.

In some embodiments, the method further involves dynamically modifying one or more PT-RS symbols of the PT-RS based on the configuration information.

In some embodiments, the dynamically modifying the one or more PT-RS symbols involves at least one of: determining an amount of in-phase and quadrature (IQ) interference of the data symbols on each of the one or more PT-RS symbols; or determining an amount of IQ interference of other PT-RS symbols on each of the one or more PT-RS symbols.

In some embodiments, the dynamically modifying the one or more PT-RS symbols includes at least one of: dynamically modifying the one or more PT-RS symbols to maximize IQ interference on the one or more PT-RS symbols; dynamically modifying the one or more PT-RS symbols to maximize a minimum IQ interference on all PT-RS symbols; dynamically modifying the one or more PT-RS symbols to set a fixed value of IQ interference for the one or more PT-RS symbols; or dynamically modifying the one or more PT-RS symbols to substantially cancel IQ interference on the one or more PT-RS symbols.

In some embodiments, the dynamically modifying the one or more PT-RS symbols includes multiplying the one or more PT-RS symbols by a weighting factor, wherein the weighting factor is one of: positive unity value and a scaling factor for the one or more PT-RS symbols; a positive unity value and a scaling factor for the one or more PT-RS symbols; a negative unity value and a scaling factor for the one or more PT-RS symbols; or a negative unity value and a scaling factor for the one or more PT-RS symbols.

In some embodiments, the receiving the configuration information includes receiving one or more of: a type of IQ interference optimization applied to the multiplexed signal to be received; a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

In some embodiments, the PT-RS weighting pattern indicates one of: the weighting factor is positive for all dynamically modified PT-RS symbols; the weighting factor is negative for all dynamically modified PT-RS symbols; the weighting factor alternates between positive and negative for each dynamically modified PT-RS symbol, starting with a positive value; or the weighting factor alternates between negative and positive for each dynamically modified PT-RS symbol, starting with a negative value.

In some embodiments, the multiplexing the PT-RS with the data signal includes multiplexing L PT-RS symbols and with M-L data symbols, resulting in a multiplexed stream of M symbols used to form a SC-OQAM symbol, wherein M and L are integer values.

In some embodiments, the L PT-RS symbols and the M-L data symbols are all real valued symbols; or the L PT-RS symbols and the M-L data symbols are all imaginary valued symbols.

According to some aspects of the disclosure, there is provided an apparatus including a processor and a computer-readable medium having stored thereon, computer executable instructions. The computer executable instructions when executed by the processor cause the apparatus to receive configuration information including one or more indication to modify one or more phase tracking reference signal (PT-RS) symbols of a PT-RS; multiplex the PT-RS with the data signal to generate a single carrier offset quadrature amplitude modulation (SC-OQAM) signal; and transmit the SC-OQAM signal.

In some embodiments, the computer executable instructions, when executed by the processor, cause the apparatus to dynamically modify one or more PT-RS symbols of the PT-RS based on the configuration information.

In some embodiments, the computer executable instructions that when executed by the processor cause the apparatus to dynamically modify the one or more PT-RS symbols include computer executable instructions to cause the apparatus to: determine an amount of in-phase and quadrature (IQ) interference of the data symbols on each of the one or more PT-RS symbols; or determine an amount of IQ interference of other PT-RS symbols on each of the one or more PT-RS symbols.

In some embodiments, the computer executable instructions that when executed by the processor cause the apparatus to dynamically modify the one or more PT-RS symbols include computer executable instructions to cause the apparatus to: dynamically modify the one or more PT-RS symbols to maximize IQ interference on the one or more PT-RS symbols; dynamically modifying the one or more PT-RS symbols to maximize a minimum IQ interference on all PT-RS symbols; dynamically modify the one or more PT-RS symbols to set a fixed value of IQ interference for the one or more PT-RS symbols; or dynamically modify the one or more PT-RS symbols to substantially cancel IQ interference on the one or more PT-RS symbols.

In some embodiments, the configuration information includes one or more of: a type of IQ interference optimization applied to the multiplexed signal to be received; a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

In some embodiments, the PT-RS weighting pattern indicates one of: the weighting factor is positive for all dynamically modified PT-RS symbols; the weighting factor is negative for all dynamically modified PT-RS symbols; the weighting factor alternates between positive and negative for each dynamically modified PT-RS symbol, starting with a positive value; or the weighting factor alternates between negative and positive for each dynamically modified PT-RS symbol, starting with a negative value.

According to some aspects of the disclosure, there is provided a method including: receiving a single carrier offset quadrature amplitude modulation (SC-OQAM) signal including a multiplexed phase tracking reference signal (PT-RS) and data signal, wherein the PT-RS includes one or more PT-RS symbols; and estimating phase errors in the received SC-OQAM signal without knowledge of whether one or more PT-RS symbols has a positive or negative value and whether IQ interference has a positive or negative value.

In some embodiments, the one or more PT-RS symbols in the received SC-OQAM signal was dynamically modified to have a positive or negative value.

In some embodiments, the method further including transmitting configuration information used to multiplex the PT-RS with the data signal to enable detection of phase errors in the received SC-OQAM signal.

In some embodiments, the configuration information includes one or more of: a type of IQ interference optimization applied to the multiplexed signal to be received; a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

In some embodiments, the PT-RS weighting pattern indicates one of: the weighting factor is positive for all dynamically modified PT-RS symbols; the weighting factor is negative for all dynamically modified PT-RS symbols; the weighting factor alternates between positive and negative for each dynamically modified PT-RS symbol, starting with a positive value; or the weighting factor alternates between negative and positive for each dynamically modified PT-RS symbol, starting with a negative value.

In some embodiments, the dynamically modified one or more PT-RS symbols is one of: dynamically modified to maximize IQ interference on the one or more PT-RS symbols; dynamically modified to maximize a minimum IQ interference on all PT-RS symbols; dynamically modified to set a fixed value of IQ interference for the one or more PT-RS symbols; or dynamically modified to substantially cancel IQ interference on the one or more PT-RS symbols.

In some embodiments, the method further including compensating the estimated phase errors.

According to some aspects of the disclosure, there is provided an apparatus including a processor and a computer-readable medium having stored thereon, computer executable instructions. The computer executable instructions when executed by the processor cause the apparatus to receive a single carrier offset quadrature amplitude modulation (SC-OQAM) signal including a multiplexed phase tracking reference signal (PT-RS) and data signal, wherein the PT-RS includes one or more PT-RS symbols; and estimate phase errors in the received SC-OQAM signal without knowledge of whether one or more PT-RS symbols has a positive or negative value and whether IQ interference has a positive or negative value.

In some embodiments, the one or more PT-RS symbols in the received SC-OQAM signal was dynamically modified to have a positive or negative value.

In some embodiments, the apparatus further including computer executable instructions, that when executed by the processor cause the apparatus to transmit configuration information used to multiplex the PT-RS with the data signal to enable detection of phase errors in the received SC-OQAM signal.

In some embodiments, the configuration information includes one or more of: a type of IQ interference optimization applied to the multiplexed signal to be received; a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

In some embodiments, the PT-RS weighting pattern indicates one of: the weighting factor is positive for all dynamically modified PT-RS symbols; the weighting factor is negative for all dynamically modified PT-RS symbols; the weighting factor alternates between positive and negative for each dynamically modified PT-RS symbol, starting with a positive value; or the weighting factor alternates between negative and positive for each dynamically modified PT-RS symbol, starting with a negative value.

In some embodiments, the dynamically modified one or more PT-RS symbols is one of: dynamically modified to maximize IQ interference on the one or more PT-RS symbols; dynamically modified to maximize a minimum IQ interference on all PT-RS symbols; dynamically modified to set a fixed value of IQ interference for the one or more PT-RS symbols; or dynamically modified to substantially cancel IQ interference on the one or more PT-RS symbols.

In some embodiments, the apparatus further including computer executable instructions, that when executed by the processor cause the apparatus to compensate the estimated phase errors.

According to some aspects of the disclosure, there is provided a method including: receiving configuration information including one or more indication that one or more phase tracking reference signal (PT-RS) symbol of a PT-RS is modified; receiving a single carrier offset quadrature amplitude modulation (SC-OQAM) signal comprising the PT-RS multiplexed with a data signal; and estimating phase errors in the received SC-OQAM signal based on the configuration information.

According to some aspects of the disclosure, there is provided an apparatus including a processor and a computer-readable medium having stored thereon, computer executable instructions. The computer executable instructions when executed by the processor cause the apparatus to receive configuration information including one or more indication to modify one or more phase tracking reference signal (PT-RS) symbols of a PT-RS; and multiplex the PT-RS with the data signal to generate a single carrier offset quadrature amplitude modulation (SC-OQAM) signal; and transmit the SC-OQAM signal.

According to some aspects of the disclosure, there is provided a method including: transmitting configuration information including one or more indication that one or more phase tracking reference signal (PT-RS) symbols of a PT-RS are modified; multiplexing the PT-RS with a data signal to generate a single carrier offset quadrature amplitude modulation (SC-OQAM) signal; and transmitting the SC-OQAM signal.

According to some aspects of the disclosure, there is provided an apparatus including a processor and a computer-readable medium having stored thereon, computer executable instructions. The computer executable instructions when executed by the processor cause the apparatus to transmit configuration information including one or more indication that one or more phase tracking reference signal (PT-RS) symbols of a PT-RS are modified; multiplex the PT-RS with a data signal to generate a single carrier offset quadrature amplitude modulation (SC-OQAM) signal; and transmit the SC-OQAM signal.

According to other aspects of the disclosure, an apparatus including one or more units for implementing any of the method aspects as disclosed in this disclosure is provided. The term "units" is used in a broader sense and referred to by any of various names, including for example, modules, components, elements, means, etc. The units can be implemented using hardware, software, firmware or any combination thereof.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

To be able to estimate phase noise in New Radio (NR), a new phase tracking reference signal (PT-RS) has been proposed for OFDM and DFT-s-OFDM communication schemes.

Figure 1A:
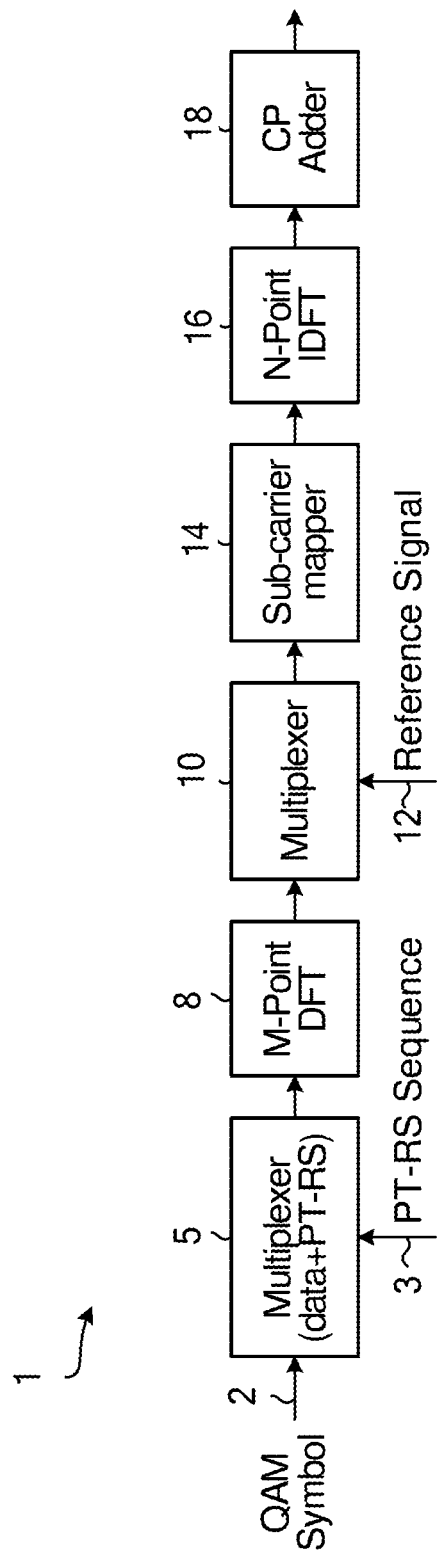
FIG. 1A is a block diagram of a DFT-s-OFDM transmitter including the use of a phase tracking reference signal.

FIG. 1A is a block diagram of a DFT-s-OFDM transmitter 1 that includes use of a PT-RS. The DFT-s-OFDM transmitter 1 includes a first multiplexer 5, an M-point Discrete Fourier Transformer (DFT) 8, a second multiplexer 10 to multiplex the output of the M-point DFT 8, a sub-carrier mapper 14, an N-point Inverse Discrete Fourier Transformer (IDFT) 16 and an cyclic prefix (CP) adder 18. In this particular example, the data is a sequence of QAM symbols. In the DFT-s-OFDM transmitter 1, a PT-RS sequence is multiplexed with a data sequence in the first multiplexer 5 before the M-point DFT 8.

Figure 1B:
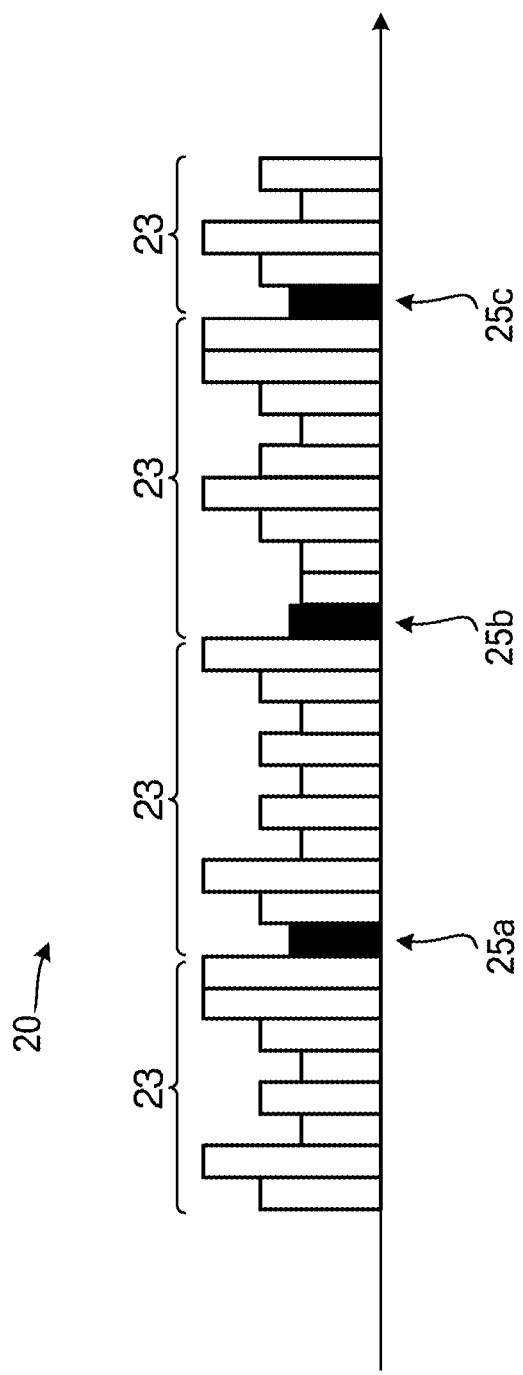
FIG. 1B is a graphical plot of a multiplexed version of data and phase tracking reference signal.

An example output of the first multiplexer 5 of the transmitter 1 is shown in FIG. 1B as a stream of symbols 20 in the time domain. Therefore, in FIG. 1B, the horizontal axis represents increasing time and the vertical axis represents amplitude. While FIG. 1B shows positive value amplitudes, it should be understood that the amplitude could be positive or negative. In the stream of symbols 20, the black symbols (represented by columns 25a, 25b and 25c) are PT-RS symbols while the white symbols (represented by columns indicated by 23) are data symbols.

FIG. 10 illustrates a schematic diagram of a DFT-s-OFDM receiver 50. In the DFT-s-OFDM receiver 50, there is a CP remover 54 for removing the CP from a received signal 52, an N-point DFT 56 for performing an N-point DFT, a sub-carrier de-mapper 58 performing sub-carrier de-mapping, a channel estimator 62 for performing channel estimation, a one-tap channel equalizer 60 for performing one-tap channel equalization based on an output from the channel estimator 62 and an output of the sub-carrier de-mapper 58, an M-point IDFT 64 and a demultiplexer (demux) 66 to separate the data and the PT-RS. Based on an output of the demux 66, phase noise (PN) estimation can be determined by phase noise estimator 70 and phase noise correction can be performed by phase noise corrector 68 based on an output from the demux 66 and an output of the phase noise estimator 70.

Although phase noise estimation and phase noise correction are referred to specifically in the example receiver 50, a similar approach can be applied to perform other types of phase error estimation and phase error correction, such as estimation and correction of carrier frequency offset.

With regard to the DFT-s-OFDM receiver 50 in FIG. 10, because subcarriers are orthogonal in the frequency domain, subsequent to the M-IDFT operation, the receiver 50 can separate the PT-RS symbols from the data symbols without any self-interference, and the PT-RS symbols can then be used for phase noise estimation. Once the phase noise is estimated, the receiver 50 can use an interpolation method to estimate phase noise on the data symbols. The receiver 50 can then mitigate phase noise on the data symbols based on the estimated phase noise.

An alternative to a DFT-s-OFDM transmission scheme is a single carrier offset quadrature amplitude modulation (SC-OQAM transmission scheme). SC-OQAM features low PAPR. SC-OQAM is also a good candidate for use at higher frequencies, because the transmission scheme tolerates phase noise better than some other schemes. In order to further improve block error rate (BLER) performance, it would be a benefit to have a PT-RS scheme for SC-OQAM for when there is phase noise present.

SC-OQAM does not have orthogonality between OQAM symbols, rather it has real domain orthogonality at the receiver. That means, in SC-OQAM, real OQAM symbols are susceptible to interference from imaginary valued symbols and similarly imaginary OQAM symbols are susceptible to interference from real valued symbols. This interference results from neighboring symbols and from the use of a pulse shaping filter. This interference is often referred to as IQ interference. While the IQ interference is not detrimental to SC-OQAM block error rate (BLER), the IQ interference may affect the manner of implementing PT-RS. If PT-RS is implemented in the same fashion as for DFT-s-OFDM, the PT-RS received at the receiver is the original PT-RS symbol plus an unknown IQ interference. Due to the effect of the unknown IQ interference, the receiver does not have sufficient knowledge to correctly estimate phase error. Therefore, a proposed methodology for using PT-RS for DFT-s-OFDM transmission schemes will not work for a SC-OQAM communication system as the SC-OQAM receiver would not be able to determine the resultant PT-RS symbol transmitted, which is the input PT-RS symbol plus unknown interference.

Figure 1C:
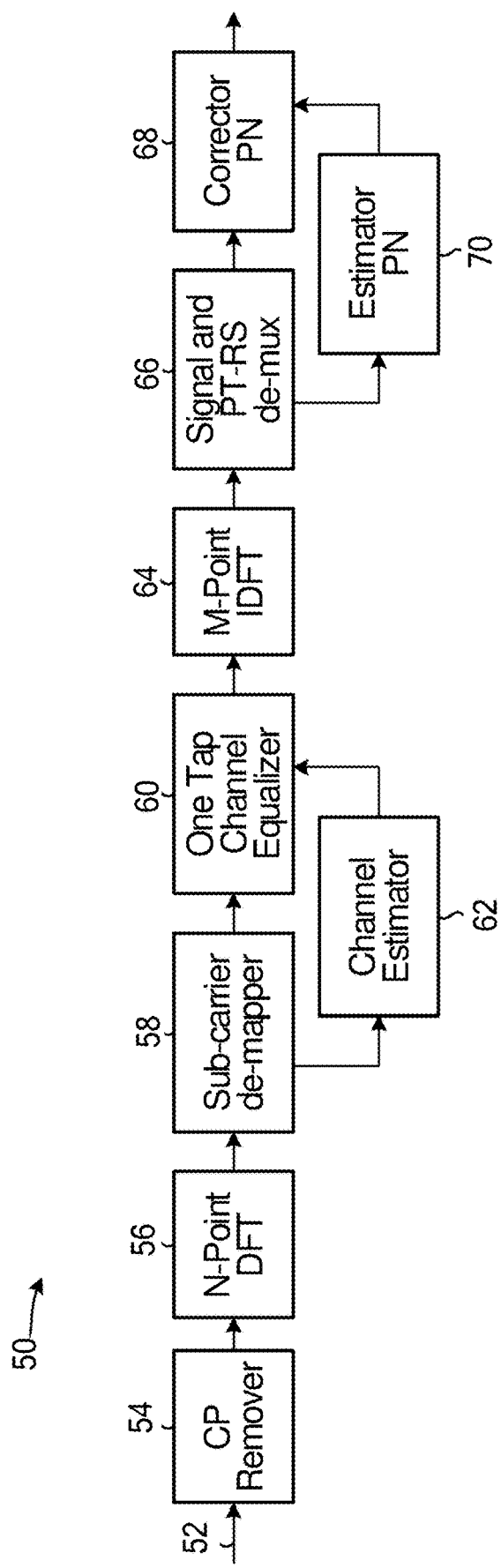
FIG. 1C is a block diagram of a DFT-s-OFDM receiver including the use of a phase tracking reference signal.
Figure 1D:
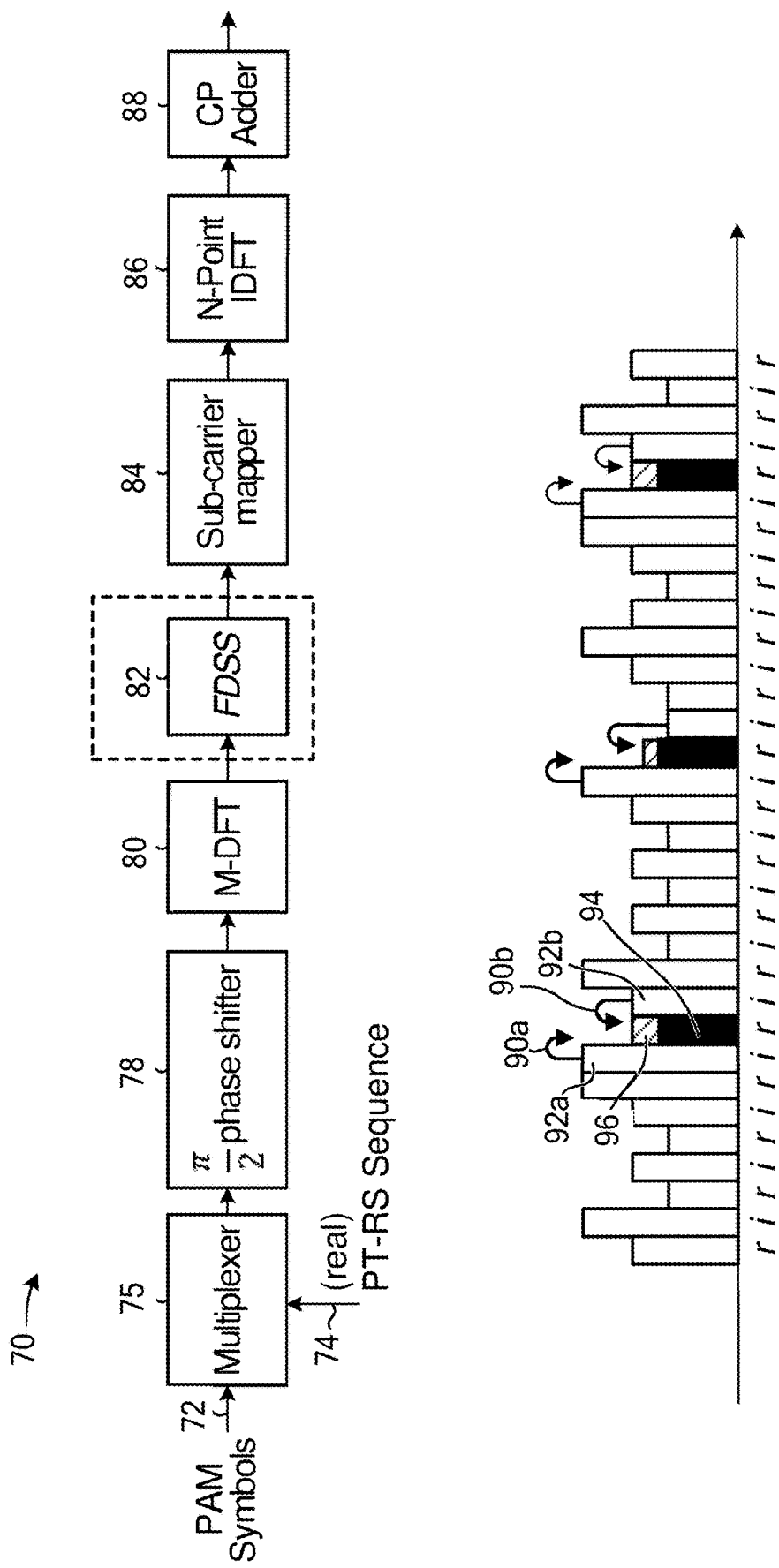
FIG. 1D is a block diagram of a single carrier offset quadrature amplitude modulation (SC-OQAM) transmitter and a graphical plot of a multiplexed version of data and phase tracking reference signal if it were to be implemented in the same manner as a DFT-s-OFDM transmitter.

FIG. 1D illustrates an example of an SC-OQAM transmitter 70 that uses PT-RS in a similar fashion to that of a DFT-s-OFDM transmission scheme. SC-OQAM transmitter 70 includes a first multiplexer 75 that can multiplex pulse amplitude modulation (PAM) symbols 72 and a PT-RS sequence 74. An output of the first multiplexer 75 is provided to a $$\frac{\pi}{2}$$

phase shifter 78. An output of the $$\frac{\pi}{2}$$

phase shifter 78 is provided to an M-point DFT 80. An output of the M-point DFT 80 is provided to a frequency domain spectral shaping (FDSS) element 82. An output of the FDSS element 82 is provided to a sub-carrier mapper 84. An output of the sub-carrier mapper 84 is provided to an N-point IDFT 86. An output of the N-point IDFT 86 is provided to a cyclic prefix (CP) adder 88.

FIG. 1D also includes a graphical plot of a multiplexed sequence of symbols output from the first multiplexer 75 and then output from the $$\frac{\pi}{2}$$

phase shifter 78. The $$\frac{\pi}{2}$$

phase shifter 78 phase shifts every other symbol by a $$\frac{\pi}{2}$$

resulting in a sequence of alternating real and imaginary valued symbols. Once the PAM symbols, together with PT-RS symbols, are phase shifted by $$\frac{\pi}{2}$$

phase shifter 78, these symbols are referred to as OQAM symbols. The horizontal axis in FIG. 1D is time. The FDSS element 82 that performs spectral shaping may cause imaginary interference when the OQAM data symbols and the PT-RS sequence are real-valued or may cause real interference when the OQAM data symbols and the PT-RS sequence are imaginary valued. The "r" and "i" below the individual symbols are to indicate real and imaginary symbols. In the illustration of FIG. 1D, the black columns are real valued PT-RS symbols and the white columns are real-valued and imaginary-valued data symbols. In proximity to the first PT-RS symbol 94, the arrows 90a, 90b pointing from adjacent imaginary valued symbols 92a, 92b, respectively, to the real valued PT-RS symbol 94, add an interference component 96 to the real valued PT-RS symbol 94. While the black columns are shown to real valued PT-RS symbols in FIG. 1D, as described previously above, the PT-RS symbols can alternatively be imaginary values.

The corresponding time domain operation to that of the spectral shaping in the frequency domain performed by the FDSS element 82 is a filtering operation. A filter having a filter length equal to 3 may be represented as $f_0+f_1D+f_{-1}D^{-1}$. In the case of a OQAM signal that is comprised of real-valued symbols, i.e. $f_0$ is a real valued symbol, the neighboring values of $f_{-1}$ and $f_1$ generate imaginary interference on the real-valued symbol at $f_0$. In the case of a raised cosine (RC) filter with a roll off factor equal to 1 the filter expression can be represented as $1+0.5D+0.5D^{-1}$.

If PT-RS symbols are used in the same manner of phase error estimation and correction as the Pre-DFT PT-RS scheme described with reference to FIGS. 1A, 1B and 1C above, there occurs a resulting interference of PT-RS symbols and the data as shown in FIG. 1D. A receiver (not shown) receiving the output of transmitter 70 is not able to correctly estimate phase error as the PT-RS symbols may have an additional unknown interference. Therefore, the Pre-DFT PT-RS scheme used for the DFT-s-OFDM transmission scheme cannot be used for a SC-OQAM transmission scheme to track phase errors and correct phase errors. An alternative arrangement for using PT-RS for a SC-OQAM transmission scheme is proposed below.

Aspects of the present disclosure provide a PT-RS scheme for use by a SC-OQAM transmitter and receiver to estimate, and correct, phase errors that occur over the communication link between the SC-OQAM transmitter and receiver. Phase errors can occur due to, for an example, phase noise or carrier frequency offset (CFO). A signal that includes PT-RS symbols can be used to determine phase error. As a result of SC-OQAM waveform generation, real-valued PT-RS symbols may incur imaginary valued interference and imaginary-valued PT-RS symbols may incur real-valued interference. In order to effectively use the PT-RS to estimate and compensate for the phase noise, the interference must be appropriately considered. In some embodiments, the proposed PT-RS scheme maintains or improves BLER performance of a SC-OQAM communication system when phase noise, or any other types of phase error, is present.

FIGS. 2A, 2B, 3A, and 3B following below provide context for the network and devices that may be in the network and that may implement aspects of the present disclosure.

Figure 2A:
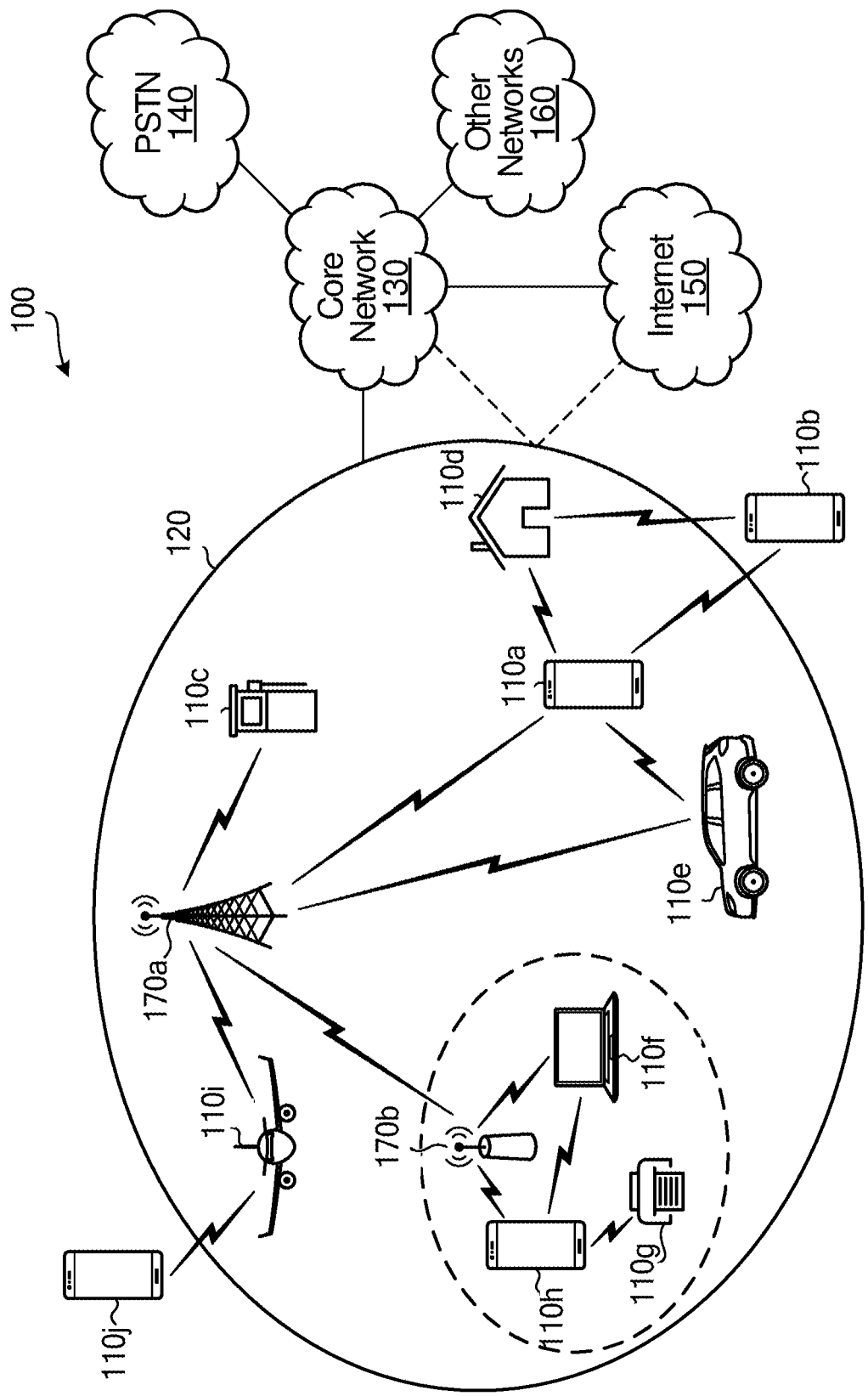
FIG. 2A is a schematic diagram of a communication system in which embodiments of the disclosure may occur.

Referring to FIG. 2A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2B:
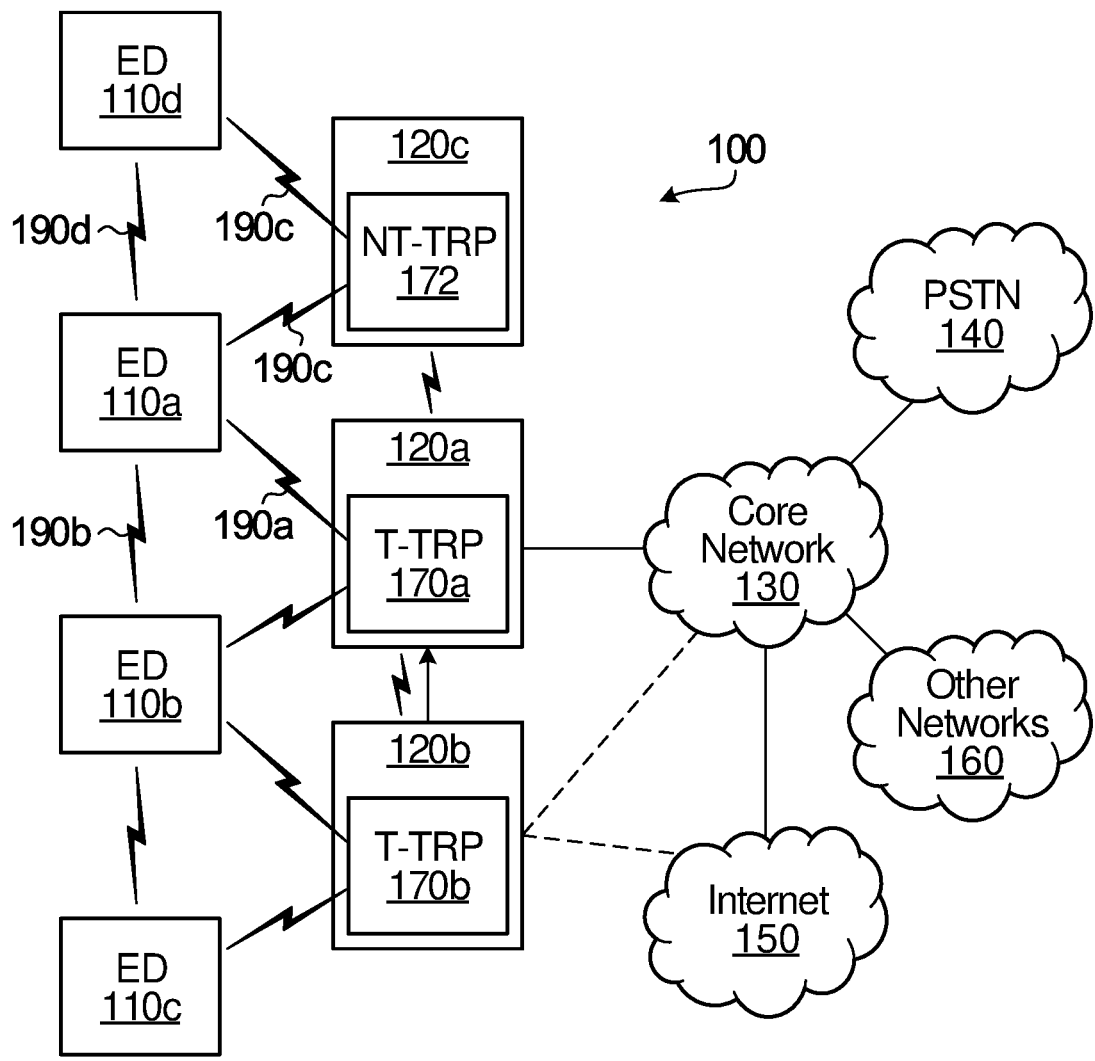
FIG. 2B is another schematic diagram of a communication system in which embodiments of the disclosure may occur.

FIG. 2B illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexibility functionality sharing, and faster physical layer link switching between terrestrial networks and non-terrestrial networks.

The terrestrial communication system and the non-terrestrial communication system could be considered subsystems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies, and incorporate multiple transceivers necessary to support such technologies.

Figure 3A:
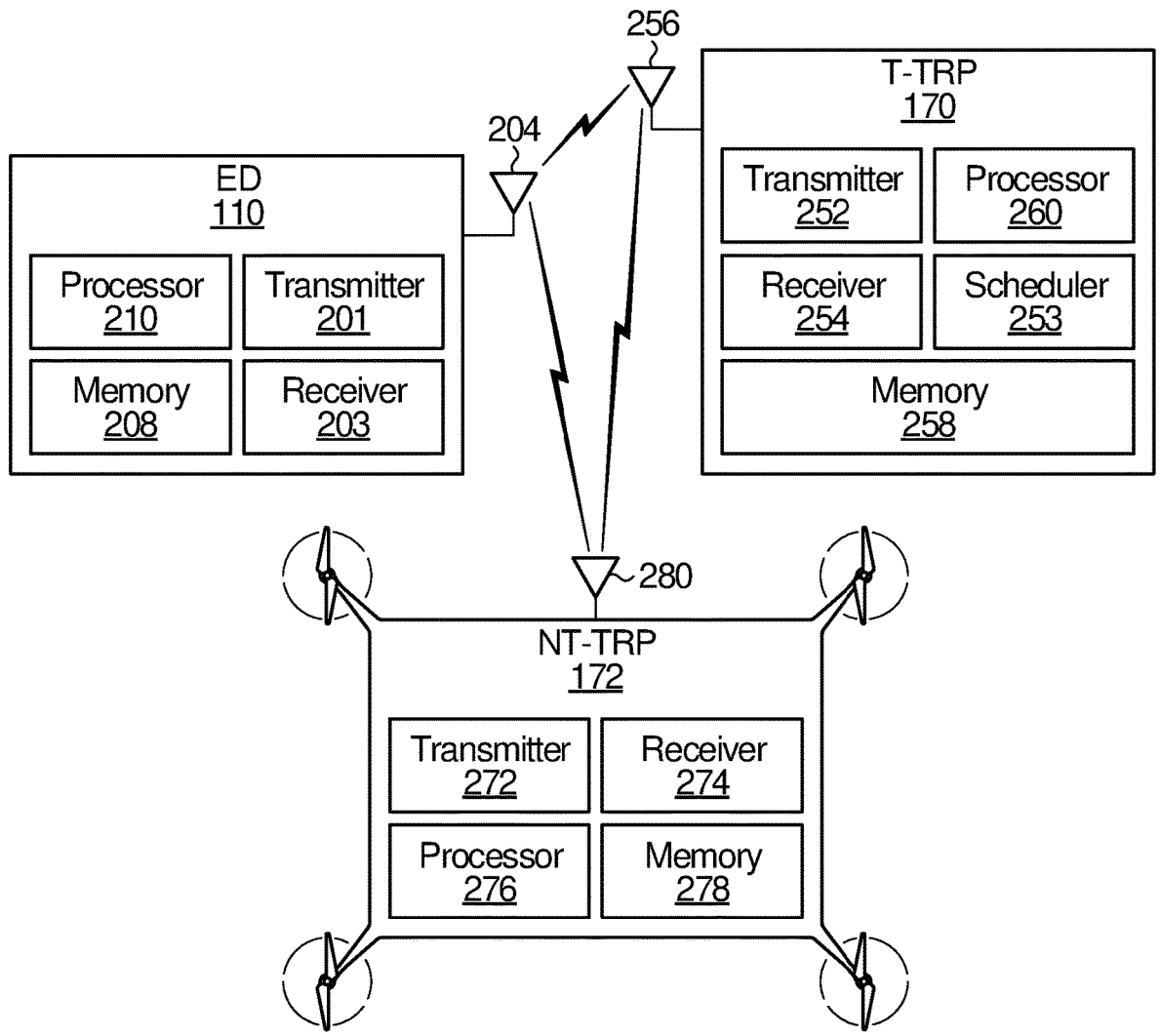
FIG. 3A is a block diagram illustrating example electronic devices and network devices.

FIG. 3A illustrates another example of an ED 110 and network devices, including a base station 170a, 170b (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 3A, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 2A). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 3B:
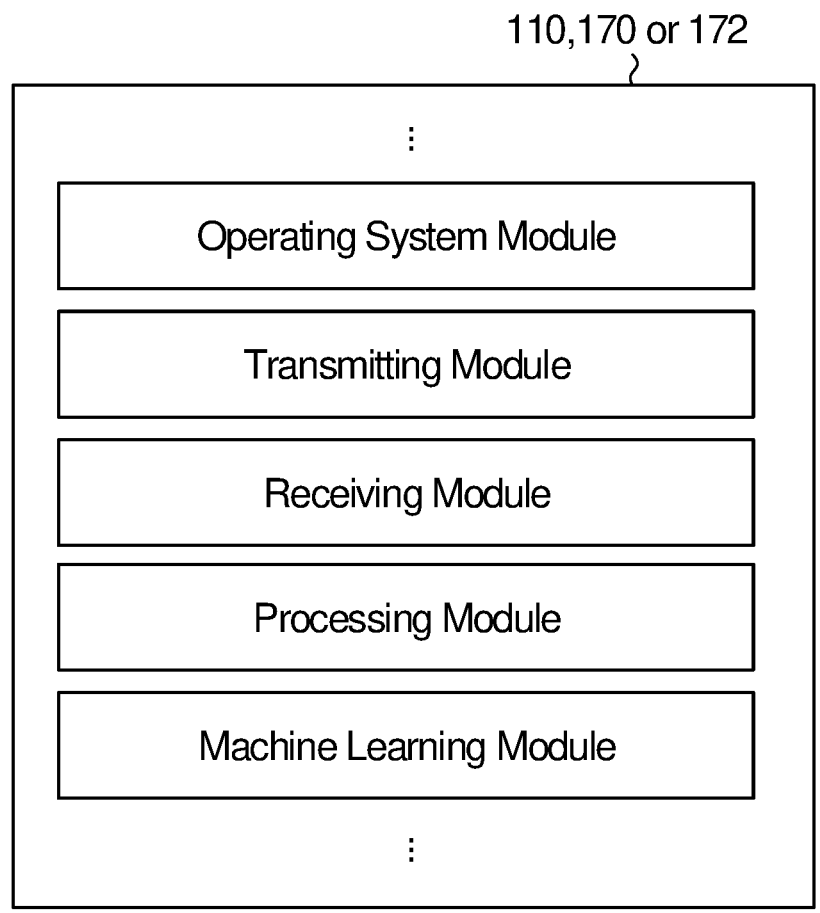
FIG. 3B is a block diagram illustrating units or modules in a device.

One or more steps of the embodiment methods provided herein may be performed by corresponding units or modules, according to FIG. 3B. FIG. 3B illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

For future wireless networks, a number of the new devices could increase exponentially with diverse functionalities. Also, a lot more new applications and use cases than 5G may emerge with more diverse quality of service demands. These will result in new key performance indications (KPIs) for the future wireless network (for an example, 6G network) that can be extremely challenging, so the sensing technologies, and AI technologies, especially ML (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication may be useful to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and sensing & positioning, etc. For MAC layer, AI/ML communication may utilize the AI/ML capability with learning, prediction and make decisions to solve the complicated optimization problems with better strategy and optimal solution, for example to optimize the functionality in MAC, e.g. intelligent TRP management, intelligent beam management, intelligent channel resource allocation, intelligent power control, intelligent spectrum utilization, intelligent MCS, intelligent hybrid automatic repeat request (HARQ) strategy, intelligent transmit/receive (Tx/Rx) mode adaption, etc.

AI/ML architectures usually involve multiple nodes, which can be organized in two modes, i.e., centralized and distributed, both of which can be deployed in access network, core network, or an edge computing system or third-party network. The centralized training and computing architecture is restricted by huge communication overhead and strict user data privacy. Distributed training and computing architecture comprises several framework, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For example, terrestrial networks based sensing and non-terrestrial networks based sensing may involve opportunities for localization and sensing applications based on a new set of features and service capabilities. Applications such as Terahertz (THz) imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be stand-alone nodes dedicated to just sensing operations or other nodes (for example TRP 170, ED 110, or core network node) doing the sensing operations in parallel with communication transmissions. A new protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to THz carrier frequency, from space, outdoor to indoor scenario, and from text, voice to video. These data collecting, processing and usage operations are performed in a unified framework or a different framework.

Figure 4:
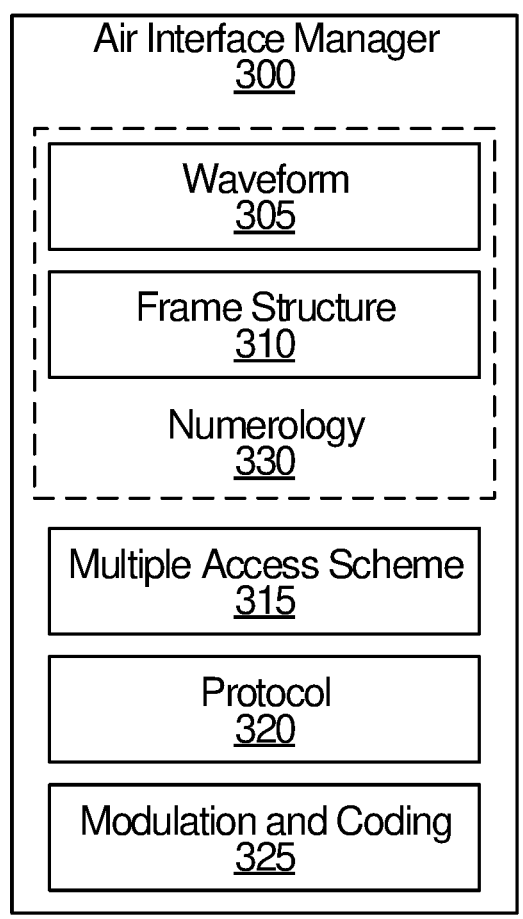
FIG. 4 is a block diagram of an air interface manager for configuring a software-configurable air interface according to an aspect of the present disclosure.

FIG. 4 illustrates a schematic diagram of an air interface manager 300 for configuring a software-configurable air interface 190. The air interface manager 300 may be, for example, a module including a number of components or building blocks that define the parameters of the air interface 190 and collectively specify how a transmission is to be made and/or received by the air interface 190. The air interface manger 300 could also or instead define the parameters of the SL air interface 180 and collectively specify how a transmission is to be made and/or received by the SL air interface 180.

The components of the air interface manger 300 include at least one of a waveform component 305, a frame structure component 310, a multiple access scheme component 315, a protocol component 320, and a modulation and coding component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra-Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, low Peak to Average Power Ratio Waveform (low PAPR WF), Discrete Fourier Transform-spread-Orthogonal Frequency Domain Modulation (DFT-s-OFDM) and single carrier Offset Quadrature Amplitude Modulation (OQAM). In some embodiments, a combination of waveform options is possible.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval (TTI) or a transmission time unit (TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication or a frequency-division duplex communication.

Additionally, the frame structure component 310 may further specify the transmission state and/or direction for each symbol in a frame. For example, each symbol may independently be configured as a downlink symbol, an uplink symbol, or a flexible symbol.

Together, the specifications of the waveform component and the frame structure component are sometimes known as the "numerology." Thus, the air interface 190 may include a numerology component 330 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE. A numerology with 15 kHz subcarrier spacing may serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz, 120 KHz, 240 KHz, or even 480 KHz and 960 KHz subcarrier spacings. Phase noise may occur at frequencies at and above 70 GHz.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range of quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access or configured grant, contention-based shared channel resource, non-contention-based shared channel resource, and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The modulation and coding component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g. 16 QAM, 64 QAM, 256 QAM etc.), or more specifically to various types of advanced modulation methods such as hierarchical modulation, multi-dimensional modulation and low Peak-to-Average Power Ratio (PAPR) modulation.

Because an air interface includes a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the modulation and coding component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

While the present application describes tracking phase errors due to phase noise, it should be understood that the underlying principles disclosed herein are not limited to phase noise. The proposed approach can be used to track other types of phase errors.

Possible solutions for addressing the issue of the receiver not accurately knowing a received PT-RS symbol due to potential IQ interference so as to be able to correctly estimate phase error include: using auxiliary PT-RS symbols to fix the IQ interference of PT-RS symbols being used for phase error estimation to a pre-agreed value; setting the PT-RS symbols to a common sign (positive or negative) and estimate inter-symbol interference (ISI); cancelling IQ interference using auxiliary PT-RS symbols; or setting some PT-RS symbols to a zero value such that IQ interference does not occur. The solutions above may use one PT-RS symbol or multiple PT-RS symbols combined as a block of PT-RS symbols, to fix the IQ interference to a pre-agreed value used, cancel IQ interference or set some PT-RS symbols to a zero value.

However, some of the above solutions have potential issues that may cause the solutions to not be as effective as desired in some situations. One problem is the IQ interference sign of the PT-RS symbols on the edge of a block of PT-RS symbols may not be known and the IQ interference sign may depend at least partly on data symbols. Therefore, the edge PT-RS symbols are not useful at the receiver for noise estimation.

Another problem is that the data symbols may create random IQ interference which can cause a positive or a negative value impact on the PT-RS symbols. In some embodiments, a goal is to eliminate IQ interference in the received signal. In such embodiments, if the IQ interference that is caused by the data offsets the data from the spectral shaping operations, then this can effectively eliminate the IQ interference. However, in some scenarios, the IQ interference cause by the data can be additive, which can be problematic from the perspective of attempting to eliminate IQ interference. As data distribution can be considered uniformly random, the occurrence of the IQ interference either cancelling or being additive can occur about equally. In some embodiments, another approach is to utilize the IQ interference, for example, by fixing the IQ interference to a fixed value or estimating the power of IQ interference at the receiver. In such embodiments, if the data dependent portion of the IQ interference offsets the remainder of the IQ interference, this can be problematic from the perspective of attempting to maintain a fixed value of IQ interference.

These two problems identified above may become more significant for smaller block sizes of PT-RS symbols. The block size is the number of consecutive PT-RS symbols.

Some embodiments of the present disclosure provide a solution that can utilize all the PT-RS symbols including PT-RS symbols at the edge of the block. Some embodiments of the present disclosure provide a solution to efficiently utilize the IQ interference of data and some PT-RS symbols on other PT-RS symbols.

An aspect of the present disclosure enables a transmitter to set the sign (positive or negative) of PT-RS symbols dynamically. The sign of PT-RS symbols is transparent to the receiver, so setting the sign does not negatively affect operation at the receiver, but by being able to do so, the transmitter has the ability to better utilize the IQ interference caused by data symbols and other PT-RS symbols. Another aspect of the present disclosure provides a receiver that can estimate phase error due to phase noise without knowing the sign of PT-RS symbol or the sign of IQ interference. This type of phase error estimation improves the phase noise estimation performance, and thus may improve the overall BLER performance at the receiver.

Figure 5A:
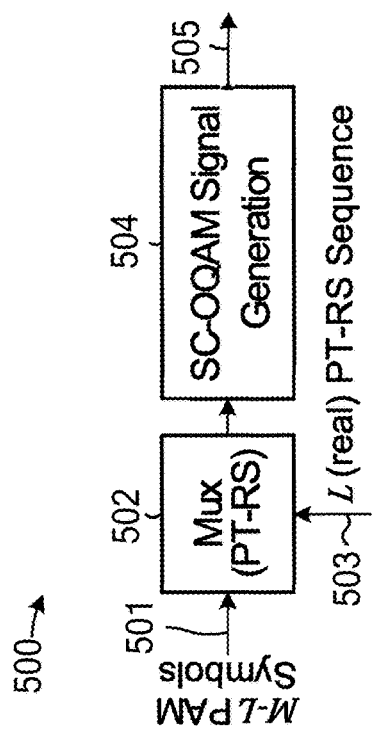
FIG. 5A illustrates a block diagram of a SC-OQAM transmitter that includes a multiplexer for multiplexing a data sequence and a phase tracking reference signal sequence according to an embodiment of the present disclosure.

Referring to FIG. 5A, an example SC-OQAM transmitter 500 will now be described that is configured to implement a PT-RS scheme that can be utilized at the receiver.

The focus of FIG. 5A is to illustrate the multiplexing of a sequence of input data symbols 501 and PT-RS symbols 503 at a multiplexer 502 that are then provided to a SC- OQAM signal generation block 504 to generate a signal 505 for transmission that can be used at a receiver to estimate phase error and perform phase error correction based on the PT-RS added at the transmitter 500. A sequence of input symbols 501 is applied to the multiplexer 502 that multiplexes the sequence of input data symbols 501 with the PT-RS sequence of symbols 503. The sequence of input data symbols 501 is an M–L length sequence of real-valued symbols where M is an even number and M and L are integer values. The sequence of PT-RS symbols 503 is an L length sequence of real-valued symbols. In FIG. 5A, this sequence is a sequence of PAM (pulse amplitude modulation) symbols. However, more generally, the sequence can be some other real valued sequence. For example, the PT-RS sequence can be generated by pseudo random generation or some other fixed sequence. The multiplexed signal output from the multiplexer 502 is applied to the SC-OQAM signal generation block 504. Further detail about the multiplexing of the sequence of input symbols and PT-RS sequence will be provided in FIGS. 5B and 5C.

Figure 5B:
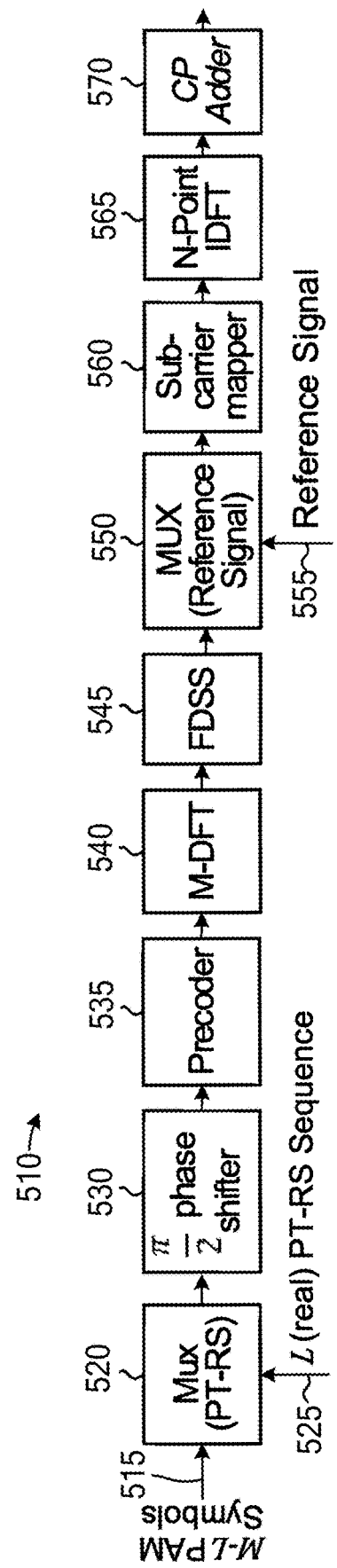
FIG. 5B illustrates a more detailed block diagram of a SC-OQAM transmitter implemented according to an embodiment of the present disclosure.

FIG. 5B is a more detailed example of a SC-OQAM transmitter 510. While FIG. 5B is one example of implementing a SC-OQAM transmitter 510, it should be understood that other arrangements may be used to generate an SC-OQAM signal and such alternative arrangements would not impact the use of a PT-RS scheme as proposed herein.

A sequence of input symbols 515 is applied to a phase tracking reference signal (PT-RS) multiplexer (MUX) 520 that multiplexes the sequence of input symbols 515 with a PT-RS sequence of real-value symbols 525. The multiplexed signal output from the PT-RS multiplexer 520 is applied to a $\pi/2$ phase shifter 530. An output of $\pi/2$ phase shifter 530 is applied to a precoder 535. An output of precoder 535 is applied to a M-point discrete Fourier transformer (DFT) 540. An output of DFT 540 is applied to a FDSS 545. An output of FDSS 545 is applied to a second multiplexer (MUX) 550. The second multiplexer 550 multiplexes the output of FDSS 545 with a reference signal 555 that can be used for channel estimation. An output of the second multiplexer 550 is applied to a sub-carrier mapper 560. An output of the sub-carrier mapper 560 is applied to an N-point inverse discrete Fourier transformer (IDFT) 565. An output of the N-point IDFT 565 is applied to a cyclic prefix (CP) adder 570.

In the example of FIG. 5B, the data input 515 is a M–L sequence of real-valued symbols where M and L are integer values. This sequence is a sequence of PAM (pulse amplitude modulation) symbols. However, as indicated above with regard to FIG. 5A, the sequence can be some other real valued sequence. The order of the PAM can be of any value, e.g. binary phase shift keying (BPSK), 4-PAM, 8-PAM, etc. The sequence may be generated from (M–L)/2 QAM symbols by separating real and imaginary parts of the QAM symbols and creating the M–L sequence symbols with the real-valued parts. A sequence of such symbols can be denoted as $a_1, a_2, \ldots, a_{M-L}$.

In FIG. 5B, the input PT-RS sequence 525 of L symbols $\{q_1, q_2, \ldots, q_L\}$ is a sequence of real-valued symbols. This sequence can be generated from a similar type of PAM constellation as the data input 515, a BPSK constellation, or any other form of real-valued constellation. In some embodiments, the PT-RS sequence can be generated by pseudo random generation or some other fixed sequence. In some embodiments, the magnitude of these L symbols can be fixed, and may be equal to the largest element of the corresponding PAM constellation of the data.

While the data input 515 and input PT-RS sequence 525 is described as being real-valued with regard to FIG. 5B, in other embodiments, both the data input and input PT-RS sequence can be imaginary-valued. One way this could be implemented is by multiplying a real-valued sequence by $i = \sqrt{-1}$. Using imaginary-valued sequences as opposed to real-valued sequences has no impact on the transmitter performance. Other embodiments for providing the input and reference signals are possible that enable a result, after a $$\frac{\pi}{2}$$

offset performed by $\pi/2$ phase shifter 530, that the symbols can be alternatively real, imaginary, real or imaginary, real, imaginary. A $\pi/2$ offset shifts every other symbol, so a mix of real and imaginary symbols can be applied and an appropriate $$\frac{\pi}{2}$$

offset rule applied to provide a result that is alternatively real, imaginary, real or imaginary, real, imaginary.

Figure 5C:
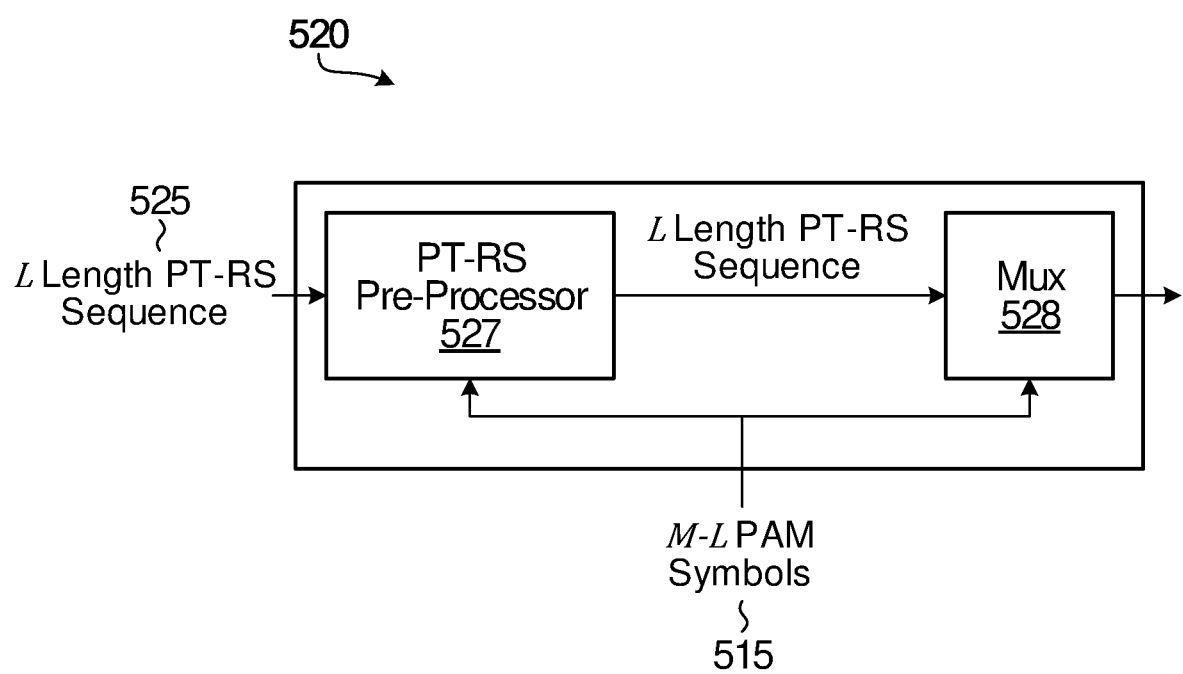
FIG. 5C illustrates a more detailed block diagram of multiplexer that is part of a SC-OQAM transmitter implemented according to an embodiment of the present disclosure.

The PT-RS multiplexer 520 multiplexes the M–L PAM symbol input data sequence 515 and the L symbol input PT-RS sequence 525 to create an M symbol output. FIG. 5C illustrates a more detailed version of PT-RS multiplexer 520. The PT-RS multiplexer 520 is shown to include a PT-RS Pre-Processor 527 and a multiplexer (Mux) 528. The PT-RS Pre-Processor 527 receives L length PT-RS symbols and the M–L sequence of real-valued input symbols. The PT-RS Pre-Processor 527 uses the M–L sequence of real-valued input symbols to determine how the input symbols affect the PT-RS symbols, as will be described in further detail below.

The PT-RS Pre-Processor 527 divides the L length PT-RS symbols into X number of blocks where the $n^{th}$ block of the X blocks contains $K_n$ number of PT-RS symbols and $\sum_{n=1}^{X} K_n = L$. For block $n \in \{1, 2 \ldots X\}$, the input PT-RS symbols are $q_{n1}, q_{n2}, \ldots, q_{nK_n} \subset \{q_1, q_2 \ldots, q_L\}$.

In some embodiments, the PT-RS Pre-Processor 527 scales the $k^{th}$ PT-RS symbol of the $n^{th}$ block by a scaling factor $\beta_{nk}$ where $\beta_{nk} \geq 0$ such that the scaled $k^{th}$ PT-RS symbol of the $n^{th}$ block can be represented as $$p_{nk} = \beta_{nk} q_{nk}, \forall n \in \{1, \ldots, X\}, k \in \{1, \ldots, K_n\}.$$

The selection procedure of $\beta_{nk}$ will be discussed in more detail below.

In some embodiments, the PT-RS Pre-processor 527 multiplies each $p_{nk} \forall n, k$ by a factor $\alpha_{nk}$, where $\alpha_{nk} \in \{-1, 1\}$, i.e. the value of $\alpha_{nk}$ is either a positive unity value (+1) or a negative unity value (−1). The $\alpha_{nk}$ parameter is transparent to the receiver, or in other terms, the receiver may not necessarily know $\alpha_{nk} \forall n, k$. After this multiplication operation of $p_{nk} \forall n, k$ by the factor $\alpha_{nk}$, the output PT-RS can be expressed as $$r_{nk} = \alpha_{nk} p_{nk}, \forall n \in \{1, \ldots, X\}, k \in \{1, \ldots, K_n\}.$$

The PT-RS Pre-Processor 527 then provides the PT-RS symbols $r_{nk}$ to the multiplexer 528 that multiplexes the PT-RS symbols $r_{nk}$ with the data. In some embodiments, the multiplexing occurs by multiplexing blocks of input symbols with blocks of PT-RS symbols, i.e. such as the X blocks indicated above. In a particular example, first there is a data block, then a PT-RS block, then another data block, and so on. The last block may be a PT-RS block or a data block. In another example, the first block is a PT-RS block, then a data block, then another PT-RS block, and so on. The last block may a PT-RS block or a data block.

After multiplexing by the PT-RS multiplexer 520, a $\pi/2$ phase offset is performed by the $\pi/2$ phase shifter 530. Let $u_1, u_2, \ldots, u_M$ be the output of the PT-RS multiplexer 520. The values $u_1, u_2, \ldots, u_M$ are multiplexed data and PT-RS symbols where $u_m \forall m$ are either real-valued or imaginary-valued. The output of the $\pi/2$ phase shifter 530 is denoted by $v_1, v_2, \ldots, v_M$, which is equal to $u_1, iu_2, u_3, iu_4, \ldots, u_{M-1}, iu_M$, or alternatively, the output can be $iu_1, u_2, iu_3, u_4, \ldots, iu_{M-1}, u_M$. Let v be the M×1 column vector where $m^{th}$ element is $v_m$.

The output of the precoder 535 is Ev where E is M×M matrix and v is a M×1 column vector where $m^{th}$ element is $v_m$. In some cases, E is a diagonal matrix. In such a case, the diagonal matrix E can be an identity matrix. Alternatively, the diagonal elements of matrix E can be a fixed constant value $\epsilon$. Alternatively, values of the diagonal elements can be varied. This precoder 535 is optional and may not be present in all SC-OQAM transmitter implementations.

The FDSS 545 performs a pulse shaping operation, also known as spectral shaping. The input to the FDSS 545 is M symbols from the M-point DFT 540. These M symbols are multiplied by FDSS elements of the FDSS 545. These FDSS elements may have J non-zero values. In some embodiments, $$\frac{M}{2} \leq J \leq M,$$

J is an odd integer and the pulse is a conjugate symmetrical square root Nyquist pulse. In some embodiments, $$\frac{M}{2} \leq J \leq M$$

can be either odd or even. In some embodiments, J can be larger than M, however, in such an embodiment the input is cyclically repeated to create a J length input.

The pulse shaping operation performed by the FDSS 545 is usually performed using a square root of a pulse in the frequency domain, in which the coefficients are denoted by $\sqrt{F_1}, \sqrt{F_2}, \ldots, \sqrt{F_J}$. The same square root pulse is used at the receiver as the match filter. The combined use of these two square root pulses at the transmitter and receiver creates a pulse with coefficients denoted by $F_1, F_2, \ldots, F_J$. In the case of a Nyquist pulse, the transmitter uses a square root Nyquist pulse and receiver uses the same square root Nyquist pulse such that the combined affect is a Nyquist pulse.

Pulse shaping in the frequency domain is equivalent to time domain filtering, in which the filter having a length $(T_1+T_2+1)$ that can be odd or even. The time domain pulse coefficients can be represented as $f_{-T_1}, f_{-T_1+1}, \ldots, f_{-1}, f_0, f_1, f_2, \ldots, f_{T_2-1}, f_{T_2}$ where the peak of the filter is $f_0$. Some of the filter coefficients may be zero.

For the case where J≤M, one way to find an equivalent filter is by zero padding the J elements of the combined transmitter and receiver pulse $F_1, F_2, \ldots, F_J$ by M–J zero elements and then performing a M-point IDFT. Other methods can be used to implement the FDSS operation, including implementation in the form of a time domain filter.

In the case where the pulse shape is a conjugate symmetrical Nyquist pulse, the filter is conjugate symmetrical (i.e. the length is odd) and $f_t=0$, where all t are even integers, except for t=0. In a particular example, if the pulse is a raised cosine with a roll off factor 1, the corresponding filter is of length 3 and coefficients are given by $f_{-1}=0.5, f_0=1, f_1=0.5$.

The second multiplexer 550 multiplexes the output of the FDSS 545 with a reference signal 555 that can be used for channel estimation. As there are multiple ways to do this operation, and the operation is not specifically related to this invention, they will not be discussed in further detail.

The sub-carrier mapping performed by the sub-carrier mapper 560 can be localized, distributed or any other type of mapping. After subcarrier mapping, and zero padding or multiplexing for different users, or both, an N-point IDFT is performed by the N-point IDFT 565. A CP can then be added before transmission of the SC-OQAM signal.

In some embodiments, IQ interference caused by the input data on the PT-RS symbols is mitigated by modifying a weighting value associated with PT-RS symbols.

For the sake of explanation, various types of PT-RS symbols will now be defined that are used in the following description. A first type is the L length input PT-RS sequence of symbols, which is denoted by $\{q_1, q_2, \ldots, q_L\}$, which correspond to the PT-RS input 525 in FIG. 5B. The PT-RS sequence is multiplexed with the M–L PAM symbol sequence data input to create an output of the M symbols. A second type is identified as usable PT-RS symbols, which are used at the receiver to estimate phase errors. The transmitter and receiver agree on which PT-RS symbols are used for estimating phase error. These symbols are the usable PT-RS symbols. Once it is agreed, the transmitter multiplexes the data input symbols, the input PT-RS symbols and the auxiliary PT-RS symbols in such a way that IQ interference may be mitigated or IQ interference may be maximized on these symbols at the receiver, which aid in estimating phase noise at the receiver.

The following section provides further description of the selection of PT-RS symbols in a manner to mitigate the effect of IQ interference on the PT-RS symbols used for phase error estimation. A similar approach may be used in which the effect of the IQ interference may be maximized. At the PT-RS Pre-processor, such as PT-RS Pre-processor 527 in FIG. 5C, the $k^{th}$ PT-RS symbol of the $n^{th}$ block is given by $$r_n = \alpha_{nk} p_{nk} = \alpha_{nk} \beta_{nk} q_{nk}, \forall n \in \{1, \ldots, K_n\},$$

where $\beta_{nk} \geq 0$ is a scaling factor, $\alpha_{nk} \in \{-1, +1\}$, and $q_{nk}$ is an input PT-RS symbol. $\mathcal{G}_n$ can be considered a subset of $\{1, \ldots K_n\}$, i.e., $\mathcal{G}_n \subset \{1, \ldots, K_n\}$ and $\overline{\mathcal{G}}_n$ can be considered the compliment of $\mathcal{G}_n$. In this scenario, $\mathcal{G}_n \cup \overline{\mathcal{G}}_n \in \{1, \ldots, K_n\}$ and $\mathcal{G}_n \cap \overline{\mathcal{G}}_n \in$ nullset.

An assumption at the transmitter is that the receiver uses the PT-RS symbols that are indexed by $\mathcal{G}_n$ for estimation purposes and the receiver ignores the PT-RS symbols that are indexed by $\overline{\mathcal{G}}_n$. In some embodiments, the transmitter modifies $p_{nk} = \beta_{nk} q_{nk}$, where $k \in \mathcal{G}_n$, to a fixed value that is known by the transmitter and the receiver. For example, the transmitter may determine the fixed value and notify the receiver or there may be a fixed value known to the transmitter and receiver, or a pool of possible fixed values and a selected one of the pool is provided to the receiver by the transmitter. This pre-agreed value may be specified at the transmitter and the receiver. In some embodiments, specifying this pre-agreed value may be performed by generating $q_{nk}$ from a same pseudo random generator and specifying the scaling factor $\beta_{nk}$ to both the transmitter and the receiver.

However, in some embodiments, $\beta_{nk}$, where $k \in \bar{\mathcal{G}}_n$, may be dynamically set at the transmitter to achieve a desired objective. Examples of a desired objective may include to maximize IQ interference on PT-RS symbols; to maximize a minimum IQ interference on all PT-RS symbols; to set a fixed value of IQ interference for the one or more PT-RS symbols; or to substantially cancel IQ interference on the one or more PT-RS symbols. Further, $\alpha_{nk} \forall n, k$ can be dynamically set at the transmitter as this information can be transparent to the receiver and the receiver may not necessarily need this information.

Due to the FDSS operations at the transmitter (for example FDSS 545 in FIG. 5B) and the receiver (for example Rx-FDSS 1145 in FIG. 8), the filtered PT-RS symbol is affected by IQ interference. For a pulse shape filter that satisfies the Nyquist conditions described above, the resultant PT-RS is given by $$\hat{r}_{nk} = r_{nk} + i\rho_{nk}s_{nk} = \alpha_{nk}\beta_{nk}q_{nk} + i\rho_{nk}s_{nk}, \forall n \in \{1, X\},$$
$$k \in \{1, \ldots, K_n\},$$

where $\rho_{nk}s_{nk}$ is the IQ interference, $s_{nk}$ is the absolute value of the IQ interference, and $\rho_{nk}$ denotes the sign of the IQ interference, i.e., $\rho_{nk} \in \{-1, +1\}$. Further, IQ interference can be expressed based on the pulse shape filter as $$\rho_{nk}s_{nk} = \frac{1}{f_0} \left[ \sum_{\substack{h=k-T_1, h\neq k}}^{k+T_2} f_{h-k} d_{nh} \right]$$

where $d_{nh} = r_{nh}$ for $1 \leq h \leq K_n$ and $f_{h-k}$ is the filter coefficient between times $T_1$ to $T_2$. When $h \leq 0$, $d_{nh}$ denotes the data of a left side of the PT-RS block that is circularly extended. When $h > K_n$, $d_{nh}$ denotes the data to a right side of the PT-RS block that is circularly extended.

The absolute value of IQ interference can be mathematically expressed in the form $$|\rho_{nk}s_{nk}| = s_{nk} = \left| \frac{1}{f_0} \left[ \sum_{\substack{h=max(1,k-T_1), h\neq k}}^{min(K_n,k+T_2)} f_{h-k} r_{nh} + I_{nk} \right] \right|$$

$$s_{nk} = \left| \frac{1}{f_0} \left[ \sum_{\substack{h=max(1,k-T_1), h\neq k}}^{min(K_n,k+T_2)} f_{h-k} \alpha_{nh} \beta_{nh} q_{nh} + I_{nk} \right] \right|$$

where $I_{nk}$ is an IQ interference component caused by data on the $k^{th}$ filtered PT-RS symbol of the $n^{th}$ block. $I_{nk}$ can be expressed in the form $$I_{nk} = \sum_{h=k-T_1}^{max(0,k-T_1-1)} f_{h-k} d_{nh} + \sum_{h=min(K_n+1,k+T_2+1)}^{k+T_2} f_{h-k} d_{nh}.$$

In some embodiments, the magnitude, the sign, or both the magnitude and sign of $I_{nk}$ is data dependent.

In some embodiments, the PT-RS may be modified in order to maximizing an IQ interference power with each PT-RS symbol in a PT-RS block. For example, in some embodiments, one or more PT-RS symbols can be modified to maximize IQ interference on the one or more PT-RS symbols. In some embodiments, one or more PT-RS symbols can be modified to maximize a minimum IQ interference on all PT-RS symbols.

The following describes an example of how to maximize IQ interference. The absolute value of IQ interference for any $n \in \{1, \ldots, X\}$ may be expressed in the form $$s_{nk} = \left| \frac{1}{f_0} \left[ \sum_{\substack{h=max(1,k-T_1), h\neq k}}^{min(K_n,k+T_2)} f_{h-k} \alpha_{nh} \beta_{nh} q_{nh} + I_{nk} \right] \right| \forall k \in \{1, \ldots, K_n\}.$$

Because $\rho_{nk}$ can be either $-1$ or $+1$ and the value of $\rho_{nk}$ is transparent to the receiver, the absolute value of IQ interference ($s_{nk}$) may be maximized by letting IQ interference from other PT-RS symbols have the same sign as the data IQ interference so that the two IQ interference values are additive in the same sign direction.

For a given PT-RS block n, there are K n such equations representing the $K_n$ IQ interference values of the $K_n$ PT-RS symbols.

IQ interference may result from the data, and the IQ interference from the data is arbitrary in magnitude and sign and cannot be controlled. The amplitude of PT-RS symbols cannot be changed as the amplitude value is agreed upon between the transmitter and the receiver. However, the sign of the PT-RS symbols can be dynamically changed at the transmitter. In particular, the transmitter is able to select a sign for the PT-RS symbols according to $\alpha \in \{+1, -1\}$ and does not have to notify the receiver of $\alpha$. A sign pattern for the PT-RS symbols can therefore be selected so that the sign pattern may achieve a desired objective. The desired objective can be any of multiple different objectives. For example, the objective may be maximizing the IQ interference as described above, maximizing a minimum IQ interference, or minimizing the IQ interference.

In some embodiments, the equations may be jointly optimized in order to maximize the IQ interference by optimizing the parameters $\alpha_{nh} \forall h \in \{1, \ldots K_n\}$ and $\beta_{nh} \forall h \in \bar{\mathcal{G}}_n$. In some embodiments, the equations may be jointly optimized in order to maximize the minimum IQ interference by optimizing the parameters $\alpha_{nh} \forall h \in \{1, \ldots K_n\}$ and $\beta_{nh} \forall h \in \bar{\mathcal{G}}_n$. Once the parameter values are optimized, the parameters may be dynamically set at the transmitter.

Figure 6A:
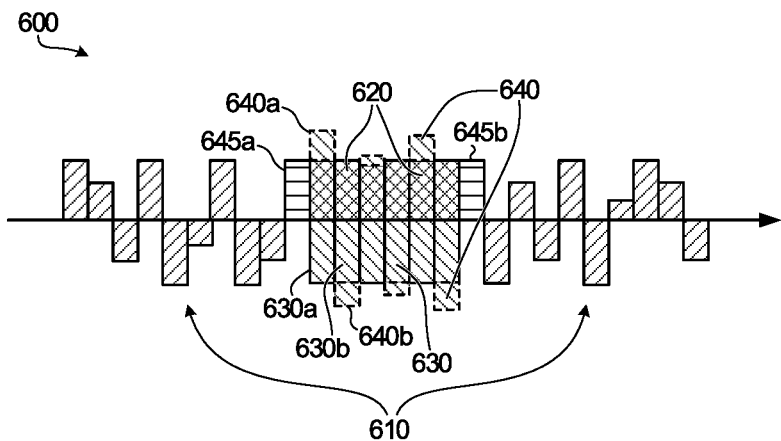
FIG. 6A illustrates a graphical plot of a multiplexed version of data and phase tracking reference of a SC-OQAM transmitter without the modification proposed to IQ interference according to embodiments of the present disclosure.
Figure 6B:
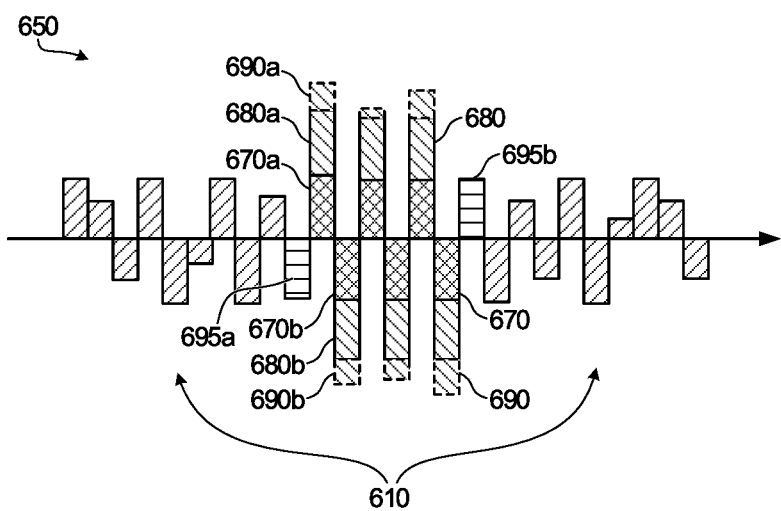
FIG. 6B illustrates a graphical plot of a multiplexed version of data and phase tracking reference signal of a SC-OQAM transmitter in which IQ interference is maximized according to an embodiment of the present disclosure.

FIGS. 6A and 6B each show an example of a multiplexed signal having both data symbols and PT-RS symbols $r_{hm} = \alpha_{hm}\beta_{hm}q_{hm}, \forall h \in \mathcal{G}_n$. FIGS. 6A and 6B are examples of how the multiplexed symbols would appear at the receiver based on a particular selection of variable to affect the IQ interference. In both FIGS. 6A and 6B, the vertical axis shows an amplitude of the symbol in which the amplitude above the horizontal axis is a positive value (plus) and the amplitude below the horizontal axis is a negative value (minus).

Referring now to FIG. 6A, the multiplexed stream includes data symbols 610, PT-RS symbols 620, IQ interference 630 resulting from other PT-RS symbols on a given PT-RS symbol, and IQ interference 640 resulting from the data 610 on a given PT-RS symbol. The two columns 645a and 645b are auxiliary PT-RS symbols $r_{hm} = \alpha_{hm}\beta_{hm}q_{hm}, \forall h \in \bar{\mathcal{G}}_n$, which are not used at the receiver for estimation purposes. In the example of FIG. 6A, the parameter $\alpha_{hn}$ is fixed to $+1$ for all PT-RS symbols, i.e. both PT-RS symbols 620 and auxiliary PT-RS symbols 645a and 645b. In FIG. 6A, at the location of some PT-RS symbols, the IQ interference 640 from the data has a different sign in comparison to the IQ interference 630 from other PT-RS symbols. For example, it can be seen that IQ interference 640a from the data has a positive value and IQ interference 630a from other PT-RS has a negative value. However, IQ interference 640b from the data has a negative value and IQ interference 630b from other PT-RS also has a negative value. Therefore, the IQ interference corresponding to the location of some PT-RS will cancel another and the IQ interference corresponding to the location of some PT-RS will add with another.

FIG. 6B is an example of how an embodiment of the disclosure may be applied to the PT-RS stream. In FIG. 6B, the multiplexed stream 650 includes data symbols 610, PT-RS symbols 670, IQ interference 680 resulting from other PT-RS symbols on a given PT-RS symbol, and IQ interference 690 resulting from the data 610 on a given PT-RS symbol. The two columns 695a and 695b are auxiliary PT-RS symbols $r_{hm}=\alpha_{hm}\beta_{hm}q_{hm}$, $\forall h \in \bar{\mathcal{G}}_n$, which are not used at the receiver for estimation purposes.

The IQ interference 670 from the data may be utilized more effectively if $\alpha_{nh}$ is set for the PT-RS based on a particular pattern. The pattern used for $\alpha_{nh}$ is an alternating +1/−1 pattern starting with a −1. An example of this is shown for instant in FIG. 7, and will be discussed in further detail below. As a result of the use of such a pattern, the auxiliary PT-RS symbol 695a has a negative value, the first PT-RS symbol 670a has a positive value, the second PT-RS symbol 670b has a negative value, and so on.

The result of the selected pattern shown in FIG. 6B is that, in this example, the IQ interference resulting from the data and for other PT-RS symbols is additive for each PT-RS symbol location that results in the IQ interference being maximized.

In such a case, i.e. where the IQ interference is being maximized, the receiver that receives such a multiplexed signal may estimate a power of the IQ interference. Then the receiver may use a procedure for phase noise estimation. In some embodiments, this may correspond to the phase noise estimation process described above. In some embodiments, the receiver may use the PT-RS symbols that are indexed by $\mathcal{G}_n$ for phase noise estimation and will discard the PT-RS symbols indexed by $\bar{\mathcal{G}}_n$.

In some embodiments, the PT-RS may be modified in order to set a particular value of IQ interference for one or more PT-RS symbol locations.

The IQ interference for any $n \in \{1, \ldots, X\}$ can be expressed as $$s_{nk} = \left| \frac{1}{f_0} \left[ \sum_{h=max(1,k-T_1), h \neq k}^{min(K_n k + T_2)} f_{h-k} \alpha_{nk} \beta_{nh} q_{nh} + I_{nk} \right] \right| \forall k \in \{1, \ldots, K_n\}.$$

The IQ interference may be set to a pre-agreed upon magnitude $s_{nk}$, which is independent of the IQ interference $I_{nk}$. The flexibility of dynamically setting the parameters $\alpha_{nh}$ $\forall h \in \{1, \ldots K_n\}$ and $\beta_{nh} \forall h \in \bar{\mathcal{G}}_n$ allow the transmitter to set the IQ interference.

Because the absolute value of IQ interference is fixed and does not depend on the data, in some embodiments, the absolute value of IQ interference can be specified at both the transmitter and the receiver. In some embodiments, several values of an absolute IQ interference can be provided to the receiver, for example in a pool of absolute IQ interference values. When the receiver is a UE, and in a downlink, the transmitter, which is a base station, may send the selection of one of the values from the pool to the UE via a high layer configuration message. For example, if there are two values in the pool, one bit can be used to indicate the selection. If there are four values in the pool, two bits can be used to indicate the selection. Again, when the receiver is a UE, and in an uplink scenario, the base station may send the selection of the absolute IQ interference value to be used by the UE, to the UE, via a higher layer configuration message.

The sign of the IQ interference is generally considered unknown to the receiver. In some embodiments, the receiver will use the PT-RS symbols that are indexed by $\mathcal{G}_n$ for phase noise estimation and will discard the PT-RS symbols indexed by $\bar{\mathcal{G}}_n$.

In some embodiments, PT-RS may be modified in order to substantially cancel IQ interference on the PT-RS symbols in a block.

The IQ interference for any $n \in \{1, \ldots, X\}$ may be expressed as $$s_{nk} = \left| \frac{1}{f_0} \left[ \sum_{h=max(1,k-T_1), h \neq k}^{min(K_n k + T_2)} f_{h-k} \alpha_{nk} \beta_{nh} q_{nh} + I_{nk} \right] \right| \forall k \in \{1, \ldots, K_n\}.$$

The IQ interference ($s_{nk}$) can be reduced to a minimal value by setting the sign of IQ interference resulting from the other PT-RS symbols to have a different sign than IQ interference resulting from the data. Setting the IQ interference to a minimal value may be performed by optimizing the parameters $\alpha_{nh} \forall h \in \{1, \ldots K_n\}$ and $\beta_{nh} \forall h \in \mathcal{G}_n$ such that $s_{nk}$ Is substantially equal to zero.

As the purpose of this embodiment is to mitigate the IQ interference, the receiver does not need to know the value of the IQ interference in order to perform phase noise estimation.

Embodiments described above enable dynamically choosing the sign of the input PT-RS to achieve an objective such as maximizing IQ interference, fixing IQ interference, or canceling IQ interference effectively.

Figure 7:
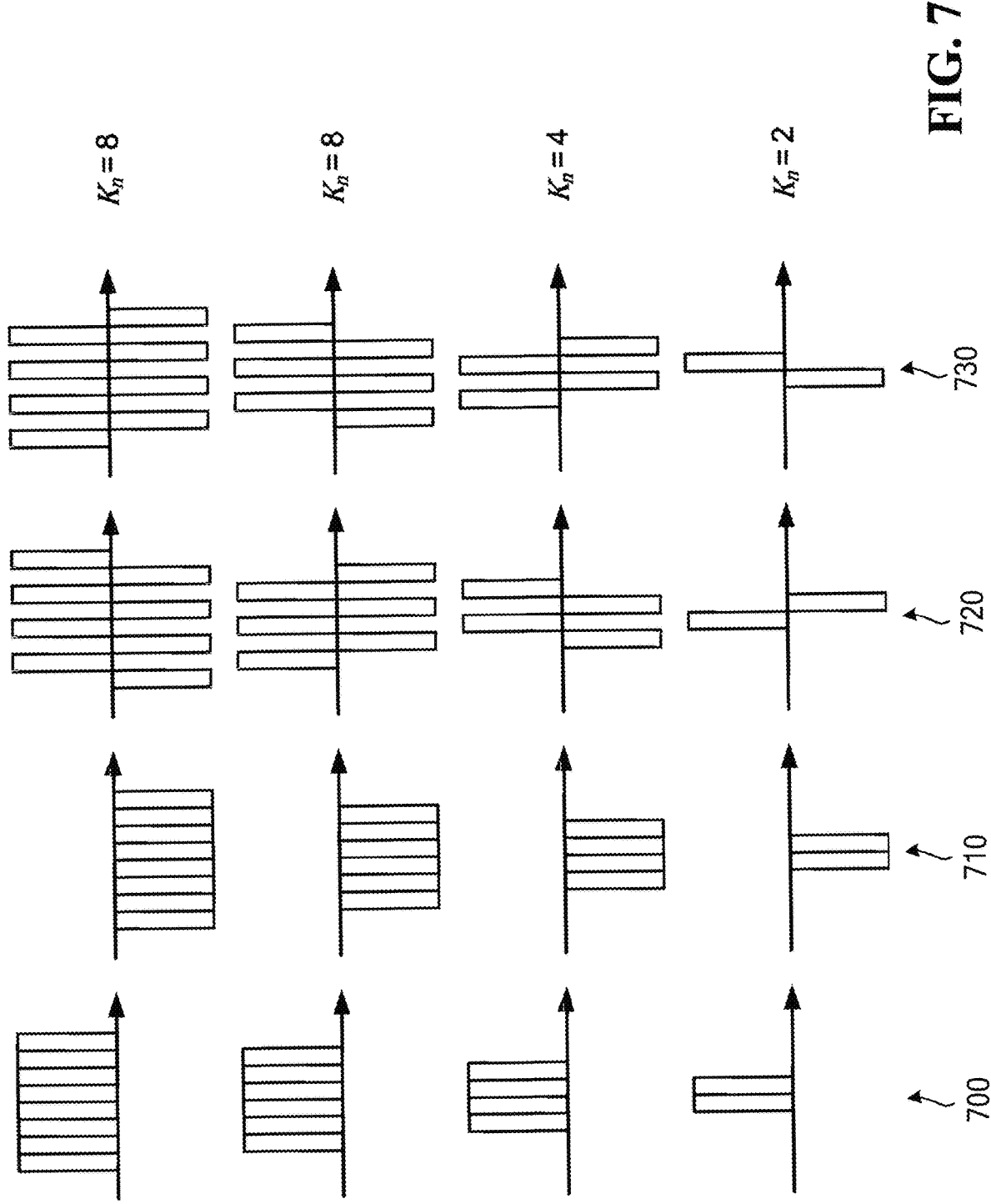
FIG. 7 illustrates examples of patterns used to modify a block of 8, 6, 4 or 2 PT-RS symbols and IQ interference on those PT-RS symbols according to an embodiment of the present disclosure.

In some embodiments, the transmitter multiplexes PT-RS symbols as blocks, for example a single block as shown in FIGS. 6A and 6B, and the length of the $n^{th}$ block is given by $K_n$. The $k^{th}$ PT-RS symbol of the $n^{th}$ block is $r_{nk}=\alpha_{nk}\beta_{nk}q_{nk}$. The parameter $\alpha_{nk} \in \{-1, +1\}$ can be dynamically set at the transmitter and the values of $\alpha_{nk}$ are transparent to the receiver. For the length of $K_n$ block, there are $2^{K_n}$ distinct patterns that can be set at the transmitter. While, $2^{K_n}$ may be a large number, it is not necessary to include that many possible different patterns. FIG. 7 shows examples of four distinct patterns that could be used irrespective of the size of $K_n$. The four patterns are:

- a pattern 700 in which all the values are positive unity values, i.e. +1, +1, +1, . . . +1;
- a pattern 710 in which all the values are negative unity values, i.e., −1, −1, −1, . . . , −1;
- a pattern 720 in which the values alternate between a negative unity value and a positive unity value, i.e., −1, +1, −1, +1, . . . , −1, +1; and
- a pattern 730 in which the values alternate between a positive unity value and a negative unity value, i.e., +1, −1, +1, −1, . . . , +1, −1.

FIG. 7 illustrates patterns for $K_n$=8, 6, 4 and 2 for each of the four different patterns.

The four patterns and block lengths $K_n$ shown in FIG. 7 are not intended to limit the possible patterns and block sizes that could be used for setting the $\alpha_{nk}$, but are merely examples that may be used In some embodiments, the number of patterns may be limited so as to limit a search space and to maximize the IQ interference.

Figure 8:
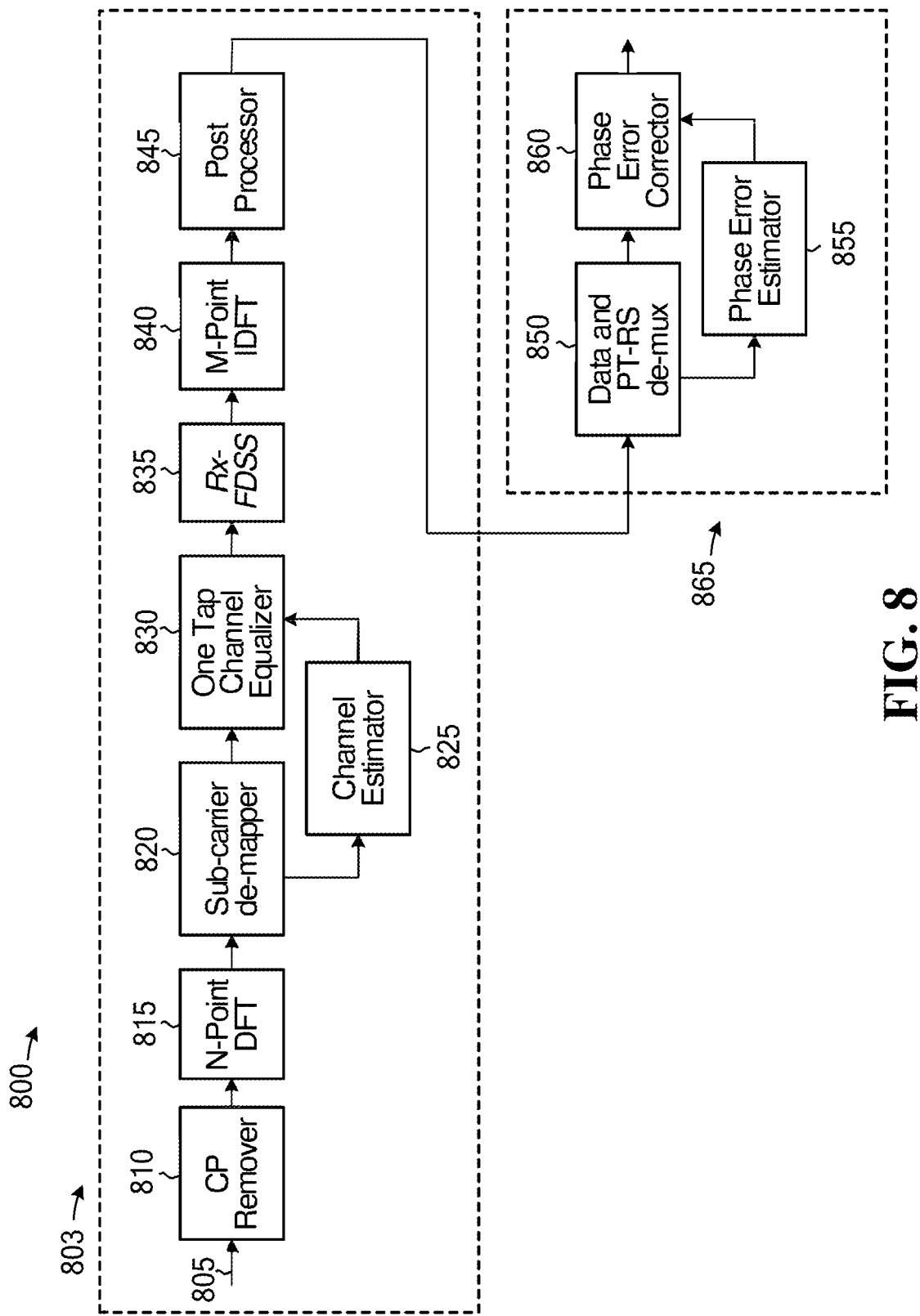
FIG. 8 illustrates a block diagram of a SC-OQAM receiver that includes a phase error estimator and phase error corrector phase tracking that uses a phase tracking reference signal sequence according to an embodiment of the present disclosure.

Referring to FIG. 8, an example SC-OQAM receiver 800 will now be described that is configured to implement a PT-RS scheme for detecting and correcting a phase error. A sequence of input symbols 805 is received at the receiver 800 and applied to a cyclic prefix (CP) remover 810. An output of the CP remover 810 is applied to a N-point DFT 815. An output of the N-point DFT 815 is applied to a sub-carrier demapper 820. An output of the sub-carrier demapper 820 is applied to a channel estimator 825 and a one tap channel equalizer 830. An output of the channel equalizer 825 is also applied to the one tap channel equalizer 830. An output of the one tap channel equalizer 830 is applied to a receiver frequency domain spectral shaper (Rx FDSS) 835. An output of the Rx FDSS 835 is applied to an M-point IDFT 840. An output of the M-point IDFT 840 is applied to post processor 845. The first dashed area 803 that includes the elements from the CP remover 810 to the post processor 845 is one approach for waveform demodulation in the receiver 800. It should be understood that other arrangements may be used to receive and demodulate an SC-OQAM signal and such alternative arrangements would not impact the use of a PT-RS scheme as proposed herein.

An output of the dashed area 803 is a sequence of received symbols that include data and PT-RS symbols. However, due to combined FDSS operations occurring at the transmitter (for example FDSS 545 in FIG. 5B) and at the receiver (for example Rx FDSS 835 in FIG. 8), the data and PT-RS symbols are filtered by the pulse shaping filter $f_{-T_1}$, $f_{-T_1+1}, \ldots, f_{-1}, f_0, f_1, f_2, \ldots, f_{T_2-1}, f_{T_2}$. Another dashed area 865 includes a demultiplexer (demux) 850, a phase error estimator 855 and a phase error corrector 860. An output of the post processor 845 is applied to the demultiplexer 850 that demultiplexes the data and PT-RS symbols. A first output of the demultiplexer 850, which is the PT-RS symbols, is applied to the phase error estimator 855 and a second output of the of the demultiplexer 850, which is the data, is applied to the phase error corrector 860. An output of the phase error estimator 855 is also applied to the phase error corrector 860. An output of the phase error estimator corrector 860 is the data symbols that have been corrected for phase noise error that may have occurred during transmission.

In the demutiplexer 850, the data and PT-RS are de-multiplexed according to a same arrangement as at the transmitter multiplexing operation. The output consists of a sequence of data symbols and a sequence of PT-RS symbols.

At the phase error estimator 855, the PT-RS symbols output from the demultiplexer 850 are received. As mentioned above, due to combined FDSS operations at the transmitter and the receiver, data and PT-RS symbols are filtered by pulse shaping filter $f_{-T_1}, f_{-T_1+1}, \ldots, f_{-1}, f_0, f_1, f_2, \ldots, f_{T_2-1}, f_{T_2}$.

At the phase error estimation block 855, the $k^{th}$ filtered PT-RS symbol of the $n^{th}$ block is given by $$\hat{r}_{nk} = u_{nk} + iv_{nk}.$$

Without a loss of generality that the PT-RS could be real or imaginary, in some embodiments the input PT-RS are real and the pulse shaping filter process adds imaginary IQ interference in the SC-OQAM signal. In this case, the real part of the filtered PT-RS symbols is $u_{nk} = r_{nk} = \alpha_{nk} p_{nk}$. As mentioned above, the receiver has the knowledge of $p_{nk}$, however, the receiver does not necessarily know the value of $\alpha_{nk} \{-1, +1\}$. Further, $v_{nk}$ is IQ interference due to the pulse shaping filter. The IQ interference $v_{nk}$ can be represented by $$v_{nk} = \rho_{nk} s_{nk}$$

where $s_{nk}$ is an absolute value of the IQ interference and $\rho_{nk}$ denotes the sign of the IQ interference, i.e., $\rho_{nk} \in \{-1, +1\}$. The sign $\rho_{nk} \in \{-1, +1\}$ is in general unknown to the receiver. However, the receiver may have the knowledge of $s_{nk}$. This knowledge can be acquired by specifying $s_{nk}$ to a pre-agreed value at the transmitter and receiver ahead of the transmission or it can be calculated at the receiver or estimated at the receiver. In some embodiments, the receiver can estimate the phase error due to phase noise based on the knowledge of $p_{nk}$ and $s_{nk}$, but without the knowledge of $\alpha_{nk}$ and $\rho_{nk}$.

Several assumptions are made when estimating the phase noise. Considering the $k^{th}$ PT-RS symbol of the $n^{th}$ block, the phase noise can be expressed as $e^{j\phi_{nk}} = \cos(\phi_{nk}) + j\sin(\phi_{nk}) = \gamma_{nk} + i\lambda_{nk}$. For the phase noise of interest, $\phi_{nk}$ is a small value and for a small value of $\phi_{nk}$, $\gamma_{nk} >> \lambda_{nk}$. In fact, $\gamma_{nk} \sim 1$ is positive and close to 1, whereas $\lambda_{nk}$ is positive or negative and small. An example of phase noise at 70 GHz may result in $\gamma_{nk} \approx 1$ and $\lambda_{nk} \leq 0.2$. The PT-RS and IQ interference magnitude should satisfy $$\min(|p_{nk}|, |s_{nk}|) > \frac{\max(|p_{nk}|, |s_{nk}|)\lambda_{nk}}{\gamma_{nk}}.$$

Without a loss of generality, it may be considered that the input PT-RS is real and the IQ interference is imaginary. Therefore, the received signal is $$y_{nk} = (\gamma_{nk} + i\lambda_{nk})(u_{nk} + iv_{nk}) + z_{nk}, u_{nk} = \alpha_{nk} p_{nk} \text{ and}$$
$$v_{nk} = \rho_{nk} s_{nk}.$$

In a mathematical representation, the receiver separates real ($y_{nk}^r$) and imaginary ($y_{nk}^i$) components of the received signal to find column vector $$\begin{bmatrix} y_{nk}^r \\ y_{nk}^i \end{bmatrix} = \begin{bmatrix} u_{nk} & -v_{nk} \\ v_{nk} & u_{nk} \end{bmatrix} \begin{bmatrix} \gamma_{nk} \\ \lambda_{nk} \end{bmatrix} + \begin{bmatrix} z_{nk}^r \\ z_{nk}^i \end{bmatrix}.$$

The above expression can be multiplied by two matrices $$\begin{bmatrix} w_{nk}^1 \\ x_{nk}^1 \end{bmatrix} = \frac{1}{p_{nk}^2 + s_{nk}^2} \begin{bmatrix} p_{nk} & -s_{nk} \\ s_{nk} & p_{nk} \end{bmatrix} \begin{bmatrix} y_{nk}^r \\ y_{nk}^i \end{bmatrix}$$

and $$\begin{bmatrix} w_{nk}^2 \\ x_{nk}^2 \end{bmatrix} = \frac{1}{p_{nk}^2 + s_{nk}^2} \begin{bmatrix} p_{nk} & s_{nk} \\ -s_{nk} & p_{nk} \end{bmatrix} \begin{bmatrix} y_{nk}^r \\ y_{nk}^i \end{bmatrix}.$$

the parameters $\gamma$ and $\lambda$ can be determined in the form $$\gamma = \max\{|w_{nk}^1|, |w_{nk}^2|\}$$

$$\hat{\lambda} = \begin{cases} x_{nk}^1 \times \text{sign}(w_{nk}^1), & \text{if } \gamma = |w_{nk}^1| \\ x_{nk}^2 \times \text{sign}(w_{nk}^2), & \text{if } \gamma = |w_{nk}^2| \end{cases}$$

where the sign(·) function returns the sign of the argument, which is either −1 or +1.

While the above description may be one manner of determining the phase noise, alternative approaches are also possible.

Another approach is described below.

The received signal at the receiver may be expressed as $$y_{nk}=e^{j\phi_{nk}}(u_{nk}+iv_{nk})+z_{nk},$$

where $u_{nk}=\alpha_{nk}p_{nk}$, $v_{nk}=\rho_{nk}s_{nk}$ and $e^{j\phi_{nk}}$ is the phase noise as defined above.

Let $\psi_{nk}=\tan^{-1}(s_{nk}/p_{nk})$, which may be known to the receiver. Further, let $$\delta_{nk}=\tan^{-1}\left(\frac{\Im(y_{nk})}{\Re(y_{nk})}\right),$$

where $\Im(y_{nk})$ denotes the imaginary value of $y_{nk}$ and $\Re(y_{nk})$ denotes the real value of $y_{nk}$.

Let $\eta_{nk}\in\{\psi_{nk},-\psi_{nk},\pi-\psi_{nk},\pi+\psi_{nk}\}$.

Assuming min $$\left(\eta_{nk},\frac{\pi}{2}-\eta_{nk}\right)\geq\phi_{nk},$$

$$\eta^*_{nk}=\arg\min_{\eta_{nk}}|\delta_{nk}-\eta_{nk}|,$$

which can be considered to be the $\eta_{nk}$ that minimizes the $|\delta_{nk}-\eta_{nk}|$.

Then the phase noise can be estimated as $$\phi_{nk}=\delta_{nk}-\eta^*_{nk}.$$

Figure 9A:
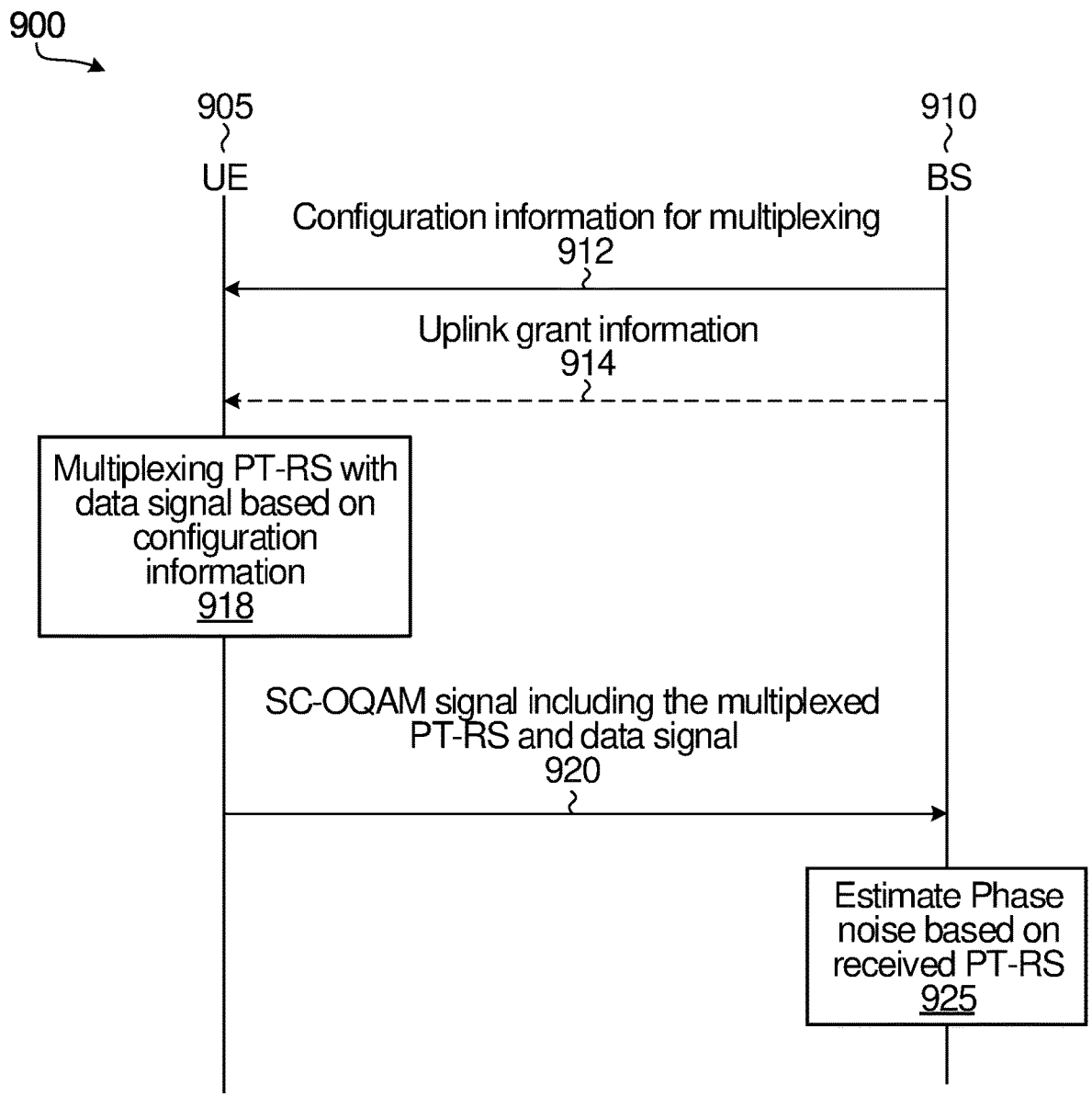
FIGS. 9A, 9B and 9C are examples of signaling flow diagrams for UL, DL and SL communications, respectively, that utilize a phase tracking reference signal to enable estimation and compensation of phase noise.
Figure 9B:
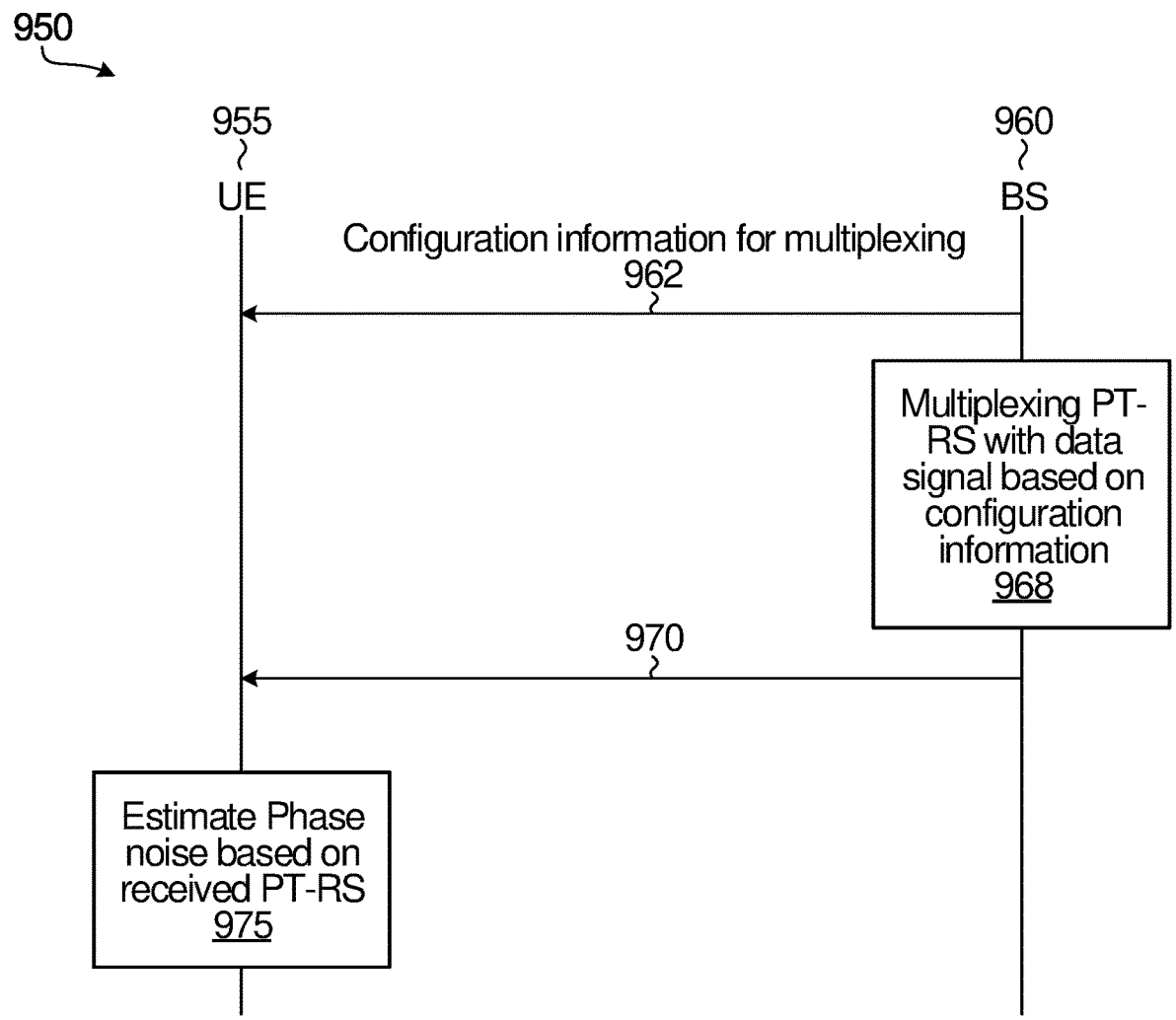
Figure 9C:
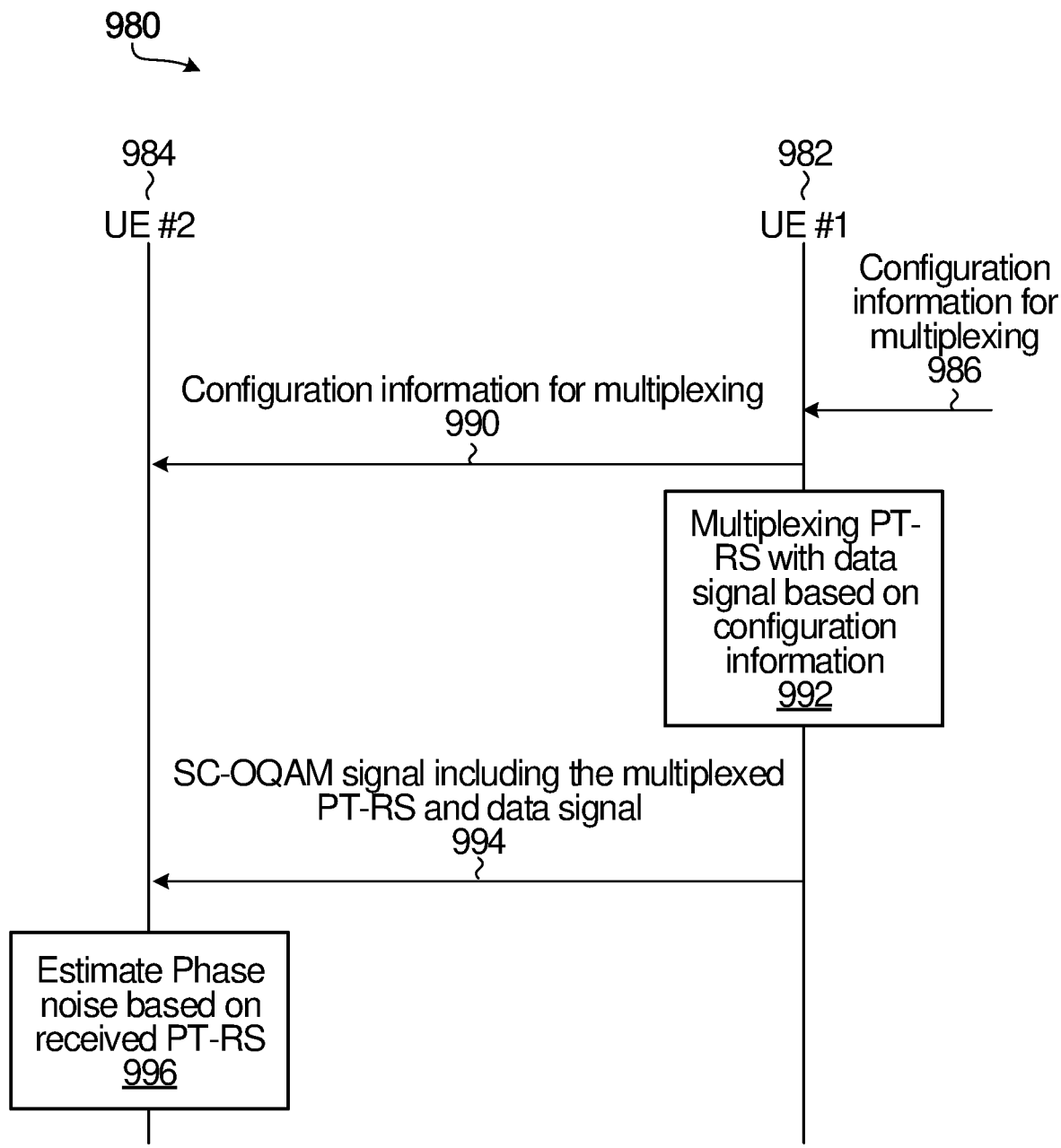

FIGS. 9A, 9B and 9C illustrate three signaling flow diagrams between a transmitter and a receiver. In the scenario of an uplink (UL) communication 900 in FIG. 9A, the transmitter is a UE 905 and the receiver is a base station (BS) 910. In the scenario of a downlink (DL) communication 950 in FIG. 9B, the transmitter is a base station 960 and the receiver is a UE 955. In the scenario of a sidelink (SL) communication 980 in FIG. 9C, the transmitter is a first UE, UE #1 982, and the receiver is a second UE, #2 UE 984.

Referring to FIG. 9A, step 912 involves the UE 905 receiving configuration information to enable the UE 905 to multiplex a PT-RS with a data signal. The resulting multiplexed PT-RS and data signal enables detection of phase noise in a transmitted SC-OQAM signal. The configuration information is shown to be transmitted from the base station 910. In some embodiments, the configuration information may be sent by the base station 910 as higher layer signaling between the base station 910 and UE 905. The higher layer signaling may use existing higher layer signaling such as radio resource control (RRC) signaling or may use a new signaling designed for this type of communication between the base station 910 and UE 905. In some embodiments, the configuration information may be sent by the base station 910 as lower layer signaling between the base station 910 and UE 905. The lower layer signaling may use existing lower layer signaling such as media access control-control element (MAC-CE) signaling or downlink control information (DCI) signaling or may use a new signaling designed for this type of communication between the base station 910 and UE 905.

In some embodiments, the configuration information may contain one or more of: an indication of a type of IQ interference optimization applied to the multiplexed signal to be received; a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value. This configuration information may be sent together in a single messaging signal, or may be sent in two or more messaging signals. For example a first high layer message may be an indication of a type of IQ interference optimization applied to the multiplexed signal to be received and a second high layer message may be one or more of: a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

In some embodiments, a lookup table could be used to provide some of the configuration information where each entry in the table has an associated index value, and the entry has set values for one or more of the variables in the preceding paragraph. Then the index can be forwarded as a configuration value. As an example, there may be four different entries, each having a respective combination of configuration values. The base station can then send one of the four entries using only two bits.

In some embodiments, the configuration information may indicate a particular type of multiplexing to be used for a particular set of resource blocks (RBs) and a different type of multiplexing to be used for a different set of RBs.

The base station 910 may optionally, at step 914, send an uplink grant to the UE 905, for the UE 905 to transmit an UL signal to the base station 910. The UL signal may be UL data and in some implementations the UL signal may include an UL demodulation reference signal (DMRS). In some embodiments, the uplink grant may be sent by the base station 910 as higher layer signaling between the base station 910 and UE 905. The higher layer signaling may use existing higher layer signaling such as radio resource control (RRC) signaling or may use a new signaling designed for this type of communication between the base station 910 and UE 905. In some embodiments, the configuration information may be sent by the base station 910 as lower layer signaling between the base station 910 and UE 905. The lower layer signaling may use existing lower layer signaling such as MAC-CE signaling or DCI signaling or may use a new signaling designed for this type of communication between the base station 910 and UE 905.

At step 918, the UE 905 multiplexes a PT-RS that has been modified by one of the embodiments described above with a data signal, the multiplexing based on the configuration information received in message 912 to obtain a multiplexed signal and then the UE 905 generates an SC-OQAM signal that includes the multiplexed PT-RS and data signal. The SC-OQAM signal may be generated based on the various embodiments described above for multiplexing the PT-RS sequence and the data signal. For example, the multiplexed sequence may be performed to maximize IQ interference, set an IQ interference to a particular value, or to minimize the IQ interference.

At step 920, the UE 905 transmits the generated SC-OQAM signal comprising the multiplexed PT-RS and the data signal. In some embodiments, the generated SC-OQAM signal may be transmitted on the uplink grant, when the uplink grant is provided in optional step 914.

At step 925, the base station 910 receives the SC-OQAM signal and uses the PT-RS component to estimate a phase noise component and compensate for the phase noise component. Estimating of the phase noise component and compensating for the phase noise component may be based on the various embodiments described above.

Referring to FIG. 9B, step 962 involves the base station 960 providing configuration information to the UE 955 regarding how the base station 960 will be multiplexing a PT-RS with a data signal so that the UE 955 can receive and decode a DL signal from the base station 960. In some embodiments, the configuration information may be sent by the base station 960 as higher layer signaling between the base station 960 and UE 950. The higher layer signaling may use existing higher layer signaling such as RRC signaling or may use a new signaling designed for this type of communication between the base station 960 and UE 950. In some embodiments, the configuration information may be sent by the base station 960 as lower layer signaling between the base station 960 and UE 950. The lower layer signaling may use existing lower layer signaling such as MAC-CE signaling or DCI signaling or may use a new signaling designed for this type of communication between the base station 960 and UE 950. The configuration information may contain one or more of: an indication of a type of IQ interference optimization applied to the multiplexed signal to be received; a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

This configuration information may be sent together in a single messaging signal, or may be sent in two or more messaging signals. For example, a first high layer message may be an indication of the type of IQ interference optimization applied to the multiplexed signal to be received and a second high layer message may be one or more of: a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

At step 968, the base station 960 multiplexes a PT-RS that has been modified by one of the embodiments described above with a data signal based on the configuration information sent in message 962 to obtain a multiplexed signal and then generates an SC-OQAM signal that includes the multiplexed PT-RS and the data signal. The SC-OQAM signal may be generated based on the various embodiments described above for multiplexing the PT-RS sequence and the data signal. For example, the multiplexed sequence may be performed to maximize IQ interference, set an IQ interference to a particular value, or to minimize the IQ interference.

At step 970, the base station 960 transmits the generated SC-OQAM signal comprising the multiplexed PT-RS and the data signal.

At step 975, the UE 955 receives the SC-OQAM signal and uses the PT-RS component to estimate a phase noise component and compensate for the phase noise component. Estimating of the phase noise component and compensating for the phase noise component may be based on the various embodiments described above.

Referring to FIG. 9C, step 986 involves a UE #1 982 receiving configuration information to enable UE #1 982 to multiplex a PT-RS with a data signal and send the multiplexed signal to UE #2 984. In some embodiments, the configuration information may be received as higher layer signaling at UE #1 982. The higher layer signaling may use existing higher layer signaling such as RRC signaling (such as PC5) or may use a new signaling designed for this type of communication to be received at the UE #1 982. In some embodiments, the configuration information may be receiver by at UE #1 982 as lower layer signaling. The lower layer signaling may use existing lower layer signaling such as MAC-CE signaling or side-link control information (SCI) signaling or may use a new signaling designed for this type of communication to be received at UE #1 982. The resulting multiplexed PT-RS and data signal enables detection of phase noise in a transmitted SC-OQAM signal at UE #2 984. The configuration information is received from a network that UE #1 982 is being served by. The configuration information may be received from a base station that is part of the network serving UE #1 982.

Step 990 involves UE #1 982 providing configuration information to a second UE #2 984 regarding how UE #1 982 will be multiplexing a PT-RS with a data signal so that UE #2 984 can receive and decode a DL signal from UE #1 982. In some embodiments, the configuration information may be sent by UE #1 982 as higher layer signaling between the UE #1 982 and UE #2 984. The higher layer signaling may use existing higher layer signaling such as RRC signaling or may use a new signaling designed for this type of communication between the UE #1 982 and UE #2 984. In some embodiments, the configuration information may be sent by UE #1 982 as lower layer signaling between the UE #1 982 and UE #2 984. The lower layer signaling may use existing lower layer signaling such as MAC-CE signaling or DCI signaling or may use a new signaling designed for this type of communication between the UE #1 982 and UE #2 984. The configuration may contain one or more of: a type of IQ interference optimization applied to the multiplexed signal to be received; a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

This configuration information may be sent together in a single messaging signal, or may be sent in two or more messaging signals. For example a first high layer message may be an indication of the type of IQ interference optimization applied to the multiplexed signal to be received and a second high layer message may be one or more of: a block size of multiplexed symbols; a number of PT-RS symbols per block; an indication of a density of PT-RS symbols over a plurality of SC-OQAM symbols; a PT-RS weighting pattern; a PT-RS sequence type; a pulse filter type used in a frequency domain spectral shaping (FDSS) filter; a pulse type used in a FDSS filter; power scaling factor; or selection of IQ interference value.

At step 992, UE #1 982 multiplexes a PT-RS that has been modified by one of the embodiments described above with a data signal based on the configuration information sent in message 990 to obtain a multiplexed signal and then generates an SC-OQAM signal that includes the multiplexed PT-RS and data signal. The SC-OQAM signal may be generated based on the various embodiments described above for multiplexing the PT-RS sequence and the data signal. For example, the multiplexed sequence may be performed to maximize IQ interference, set an IQ interference to a particular value, or to minimize the IQ interference.

At step 994, UE #1 982 transmits the generated SC-OQAM signal comprising the multiplexed PT-RS and the data signal.

At step 996, UE #2 984 receives the SC-OQAM signal and uses the PT-RS component to estimate a phase noise component and compensate for the phase noise component. Estimating of the phase noise component and compensating for the phase noise component may be based on the various embodiments described above.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
    receiving configuration information including one or more indications to modify one or more phase tracking reference signal (PT-RS) symbols of a PT-RS;
    dynamically modifying the one or more PT-RS symbols of the PT-RS based on the configuration information;
    multiplexing the PT-RS, with a data signal to generate a single carrier offset quadrature amplitude modulation (SC-OQAM) signal; and
    transmitting the SC-OQAM signal.

2. The method of claim 1, wherein the dynamically modifying the one or more PT-RS symbols comprises at least one of:
    determining an amount of in-phase and quadrature (IQ) interference of data symbols on each of the one or more PT-RS symbols; or
    determining an amount of IQ interference of other PT-RS symbols on each of the one or more PT-RS symbols.

3. The method of claim 1, wherein the dynamically modifying the one or more PT-RS symbols comprises at least one of:
    dynamically modifying the one or more PT-RS symbols to maximize IQ interference on the one or more PT-RS symbols;
    dynamically modifying the one or more PT-RS symbols to maximize a minimum IQ interference on all PT-RS symbols;
    dynamically modifying the one or more PT-RS symbols to set a fixed value of IQ interference for the one or more PT-RS symbols; or
    dynamically modifying the one or more PT-RS symbols to substantially cancel IQ interference on the one or more PT-RS symbols.

4. The method of claim 3, wherein the dynamically modifying the one or more PT-RS symbols comprises multiplying the one or more PT-RS symbols by a weighting factor, wherein the weighting factor includes one of:
    a positive unity value and a scaling factor for the one or more PT-RS symbols; or
    a negative unity value and the scaling factor for the one or more PT-RS symbols.

5. The method of claim 4, wherein the receiving the configuration information comprises receiving one or more of:
    a type of IQ interference optimization applied to a multiplexed signal to be received;
    a block size of multiplexed symbols;
    a number of PT-RS symbols per block;
    an indication of a density of PT-RS symbols over a plurality of SC-OQAM symbols;
    a PT-RS weighting pattern;
    a PT-RS sequence type;
    a pulse filter type used in a frequency domain spectral shaping (FDSS) filter;
    a pulse type used in a FDSS filter;
    power scaling factor; or
    selection of an IQ interference value.

6. The method of claim 5, wherein the PT-RS weighting pattern indicates one of:
    the weighting factor is positive for all dynamically modified PT-RS symbols;
    the weighting factor is negative for all dynamically modified PT-RS symbols;
    the weighting factor alternates between positive and negative for each dynamically modified PT-RS symbol, starting with a positive value; or
    the weighting factor alternates between negative and positive for each dynamically modified PT-RS symbol, starting with a negative value.

7. The method of claim 1, wherein the multiplexing the PT-RS with the data signal comprises multiplexing L PT-RS symbols with M-L data symbols, resulting in a multiplexed stream of M symbols used to form a SC-OQAM symbol, wherein M and L are integer values.

8. The method of claim 7, wherein:
    the L PT-RS symbols and the M-L data symbols are all real valued symbols; or
    the L PT-RS symbols and the M-L data symbols are all imaginary valued symbols.

9. An apparatus comprising:
a processor; and
a computer-readable medium having stored thereon, computer executable instructions, that when executed by the processor cause the apparatus to:
receive configuration information including one or more indications to modify one or more phase tracking reference signal (PT-RS) symbols of a PT-RS;
dynamically modify the one or more PT-RS symbols of the PT-RS based on the configuration information;
multiplex the PT-RS with a data signal to generate a single carrier offset quadrature amplitude modulation (SC-OQAM) signal; and
transmit the SC-OQAM signal.

10. The apparatus of claim 9, wherein the computer executable instructions that when executed by the processor cause the apparatus to dynamically modify the one or more PT-RS symbols comprise computer executable instructions to cause the apparatus to:
determine an amount of in-phase and quadrature (IQ) interference of data symbols on each of the one or more PT-RS symbols; or
determine an amount of IQ interference of other PT-RS symbols on each of the one or more PT-RS symbols.

11. The apparatus of claim 9, wherein the computer executable instructions that when executed by the processor cause the apparatus to dynamically modify the one or more PT-RS symbols comprise computer executable instructions to cause the apparatus to:
dynamically modify the one or more PT-RS symbols to maximize IQ interference on the one or more PT-RS symbols;
dynamically modify the one or more PT-RS symbols to maximize a minimum IQ interference on all PT-RS symbols;
dynamically modify the one or more PT-RS symbols to set a fixed value of IQ interference for the one or more PT-RS symbols; or
dynamically modify the one or more PT-RS symbols to substantially cancel IQ interference on the one or more PT-RS symbols.

12. The apparatus of claim 9, wherein the configuration information comprises one or more of:
a type of IQ interference optimization applied to a multiplexed signal to be received;
a block size of multiplexed symbols;
a number of PT-RS symbols per block;
an indication of a density of PT-RS symbols over a plurality of SC-OQAM symbols;
a PT-RS weighting pattern;
a PT-RS sequence type;
a pulse filter type used in a frequency domain spectral shaping (FDSS) filter;
a pulse type used in a FDSS filter;
power scaling factor; or
selection of an IQ interference value.

13. The apparatus of claim 12, wherein the PT-RS weighting pattern indicates one of:
a weighting factor is positive for all dynamically modified PT-RS symbols;
the weighting factor is negative for all dynamically modified PT-RS symbols;
the weighting factor alternates between positive and negative for each dynamically modified PT-RS symbol, starting with a positive value; or
the weighting factor alternates between negative and positive for each dynamically modified PT-RS symbol, starting with a negative value.

14. A method comprising:
receiving a single carrier offset quadrature amplitude modulation (SC-OQAM) signal comprising a phase tracking reference signal (PT-RS) multiplexed with a data signal, wherein the PT-RS comprises one or more PT-RS symbols; and
estimating phase errors in the SC-OQAM signal without knowledge of whether the one or more PT-RS symbols has a positive or negative value and whether IQ interference has a positive or negative value.

15. The method of claim 14, wherein the one or more PT-RS symbols in the SC-OQAM signal was dynamically modified to have a positive or negative value.

16. The method of claim 14, further comprising transmitting configuration information used to multiplex the PT-RS with the data signal to enable detection of phase errors in the SC-OQAM signal.

17. The method of claim 16, wherein the configuration information comprises one or more of:
a type of IQ interference optimization applied to a multiplexed signal to be received;
a block size of multiplexed symbols;
a number of PT-RS symbols per block;
an indication of a density of PT-RS symbols over a plurality of SC-OQAM symbols;
a PT-RS weighting pattern;
a PT-RS sequence type;
a pulse filter type used in a frequency domain spectral shaping (FDSS) filter;
a pulse type used in a FDSS filter;
power scaling factor; or
selection of an IQ interference value.

18. The method of claim 17, wherein the PT-RS weighting pattern indicates one of:
a weighting factor is positive for all dynamically modified PT-RS symbols;
the weighting factor is negative for all dynamically modified PT-RS symbols;
the weighting factor alternates between positive and negative for each dynamically modified PT-RS symbol, starting with a positive value; or
the weighting factor alternates between negative and positive for each dynamically modified PT-RS symbol, starting with a negative value.

* * * * *

UNITED STATES PATENT AND TRADEMARK OFFICE
CERTIFICATE OF CORRECTION

PATENT NO. : 12,476,858 B2  
APPLICATION NO. : 18/496825  
DATED : November 18, 2025  
INVENTOR(S) : Ferdinand et al.

Page 1 of 1

It is certified that error appears in the above-identified patent and that said Letters Patent is hereby corrected as shown below:

In the Claims

In Column 38, Claim 5, Line 43, delete "power" and insert -- a power --.

In Column 39, Claim 12, Line 58, delete "power" and insert -- a power --.

In Column 40, Claim 17, Line 43, delete "power" and insert -- a power --.

Signed and Sealed this  
Sixth Day of January, 2026

John A. Squires  
*Director of the United States Patent and Trademark Office*